United States Patent [19]
Takriti

[11] Patent Number: 6,021,402
[45] Date of Patent: Feb. 1, 2000

[54] RISK MANAGEMENT SYSTEM FOR ELECTRIC UTILITIES

[75] Inventor: Samer Takriti, Chappaqua, N.Y.

[73] Assignee: International Business Machines Corporaiton, Armonk, N.Y.

[21] Appl. No.: 08/869,561

[22] Filed: Jun. 5, 1997

[51] Int. Cl.⁷ .................................................... G06F 17/60
[52] U.S. Cl. .................... 705/412; 364/148.01; 364/149; 364/152; 364/153; 364/528.21; 364/528.26; 364/528.3
[58] Field of Search .............................. 364/148.01, 149, 364/152, 153, 528.21, 528.22, 528.23, 528.26, 528.3; 705/412

[56] References Cited

U.S. PATENT DOCUMENTS

| | | | |
|---|---|---|---|
| 2,841,331 | 7/1958 | Starr et al. | 705/412 |
| 2,923,832 | 2/1960 | Cohn | 307/57 |
| 3,117,221 | 1/1964 | Kirchmayer | 364/802 |
| 3,124,699 | 3/1964 | Kirchmayer | 307/57 |
| 3,229,110 | 1/1966 | Kleinbach et al. | 307/57 |
| 3,932,735 | 1/1976 | Giras | 364/528.22 |
| 4,604,714 | 8/1986 | Putman et al. | 364/528.23 |
| 5,432,710 | 7/1995 | Ishimaru et al. | 705/412 |
| 5,553,003 | 9/1996 | Harada et al. | 364/528.21 |
| 5,621,654 | 4/1997 | Cohen et al. | 364/528.22 |
| 5,734,586 | 3/1998 | Chiang et al. | 364/528.21 |

OTHER PUBLICATIONS

Merlin et al: A New Method for Unit Commitment at Electricite De France; IEEE Transactions on Power Apparatus and Systems, vol. PAS–102, No. 5, May 1983; pp. 1218–1225.

Takriti, S., Birge, J. R., & Long, E., "A stochastic model for the unit commitment problem," *IEEE Transactions on Power Systems*, vol. 11, No. 3, pp. 1497–1508, Aug. 1996.

Carpentier, P., Cohen, G., & Culioli, J. C., "Stochastic optimization of unit commitment: a new decomposition framework," *IEEE Transactions on Power Systems*, vol. 11, No. 2, pp. 1067–1073, May 1996.

Schramm, H. & Zowe, J., "A version of the bundle idea for minimizing a nonsmooth function: conceptual idea, convergence analysis, numerical results," *SIAM Journal of Optimization*, vol. 2, No. 1, pp. 121–152, Feb. 1992.

Lustig, I. J., Mulvey, J. M. & Carpenter, T. J., "Formulating stochastic programs for interior point methods," *Operations Research*, vol. 39, pp. 757–770, 1990.

Lustig, I. J. & Rothberg, E., "Gigaflops in linear programming," *Operations Research Letters*, vol. 18, pp. 157–165, 1996.

Rockafellar, R. T. & Wets, R. J. B., "Scenarios and policy aggregation in optimization under uncertainty," *Mathematics of Operations Research*, vol. 16, No. 1, pp. 119–147., 1991.

Zuhang, F. & Galiana, F. D., "Towards a more rigorous and practical unit commitment by lagrangian relaxation," *IEEE Transactions on Power Systems*, vol. 3, No. 2, pp. 763–773, May 1988.

Kazarlis, S. A., Bakirtzis, A. G. & Petridis, V., "A genetic algorithm solution to the unit commitment problem," *IEEE Transactions on Power Systems*, vol. 11, No. 1, pp. 83–92, Feb. 1996.

Flory, J., "Electricity transactions in an open access market," *IEEE Power Engineering Review*, pp. 15–18, Jan. 1996.

MacGregor, P. R. & Puttgen, H. B., "The integration of non–utility generation and spot prices within utility generation scheduling," *IEEE Transactions on Power Systems*, vol. 9, No. 3, pp. 1302–1308, Aug. 1994.

Sheble, G. B. & Fahd, G. N., "Unit commitment literature synopsis," *IEEE Transactions on Power Systems*, vol. 9, No. 1, pp. 128–135, Feb. 1994.

Lee, F. N., The application of commitment utilization factor (CUF) to thermal unit commitment, *IEEE Transactions on Power Systems*, vol. 6, No. 2, pp. 691–698, May 1991.

Hsu, Y., Su, C., Liang, C., Lin, C. & Huang, C., "Dynamic security constrained multi–area unit commitment," *IEEE Transactions on Power Systems*, vol. 6, No. 3, pp. 1049–1055, Aug. 1991.

Rusic, S. & Rajokovic, N., "A new approach for solving extended unit commitment problem," *IEEE Transactions on Power Systems*, vol. 6, No. 1, pp. 269–277, Feb. 1991.

Aoki, K., Itoh, M., Satoh, T., Nara, K., & Kanezashi, M., "Optimal long–term unit commitment in large scale systems including fuel constrained thermal and pumped–storage hydro," *IEEE Transactions on Power Systems*, vol. 4, No. 3, pp. 1065–1073, Aug. 1989.

Hobbs, W. J., Hermon, G., Warner, S. & Sheble, G. B., "An enhanced dynamic programming approach for unit commitment," *IEEE Transactions on Power Systems*, vol. 3, No. 3, pp. 1201–1205, Aug. 1988.

Lee, F., "Short–term thermal unit commitment: a new method," *IEEE Transactions on Power Systems*, vol. 3, No. 2, pp. 421–428, May 1988.

(List continued on next page.)

*Primary Examiner*—Edward R. Cosimano
*Attorney, Agent, or Firm*—Whitham, Curtis & Whitham; Stephen C. Kaufman

[57] ABSTRACT

A computer implemented risk-management system schedules the generating units of an electric utility while taking into consideration power trading with other utilities and the stochastic load on the utility system. The system provides the user with a tool that generates multiple load forecasts and allows the user to vary the fuel price between the different scenarios and the different periods of the planning horizon. The tool allows the user to model accurately the uncertain trading transactions and the changing fuel prices to meet the electric demand of customers at a minimal cost while making the maximum profit possible from power trading. The tool also allows the user to apply any set of linear constraints to fuels. A mathematical model of the problem is solved to provide the status of each generator at each time period of the planning horizon under each given scenario, the load on each generator during each period in which it is operating, an optimal fuel mix for each generating unit, and the prices for purchasing and selling power in the periods of the planning horizon.

7 Claims, 13 Drawing Sheets

OTHER PUBLICATIONS

Bertsekas, D. P., Lauer, G. S., Sandell, N. R. & Posbergh, T. A., "Optimal short–term scheduling of large–scale power systems," *IEEE Transactions on Augomatic Control,* vol. Ac–28, No. 1, pp. 1–11, Jan. 1983.

Bertsekas, D. P., Lauer, G. S., Sandell, N. R. & Posbergh, T. A., "Solution of large–scale optimal unit commitment problems," *IEEE Transaction on Power Apparatus and Systems,* vol. PAS–101, No. 1, pp. 79–86, Jan. 1982.

Muchstadt, J. A. & Koenig, S. A., "An application of lagrangian relaxation to scheduling in power–generation systems,"*Operations Research,* vol. 25, No. 3, pp. 387–403, May–Jun. 1977.

Kerr, R. H., Scheidt, J. L., Fontana, A. J. & Wiley, J. K., "Unit commitment," *IEEE Transactions on Power Apparatus and Systems,* vol. pas–85, No. 5, pp. 417–436, May 1966.

Hara, K., Kimuar, M., & Honda, N., "A method for planning economic unit commitment and maintenance of thermal power systems," *IEEE Transactions on Power Apparatus and Systems,* vol. pas–85, No. 5, pp. 427–435, May 1966.

Happ, H. H., Johnson, R. C. & Wright, W. J., "Large scale hydro–thermal unit commitment method and results," *IEEE Transactions on Power and Systems,* 1971.

Moller, A. & Romisch, W., "A dual method for the unit commitment problem," *Humboldt–Universitat Zu Berlin,* pp. 1–8,1995.

OPERATING-COST CURVE WITH TWO FUELS

HEAT-INPUT TO POWER-OUTPUT CURVE

RISK MANAGEMENT SYSTEM FOR ELECTRIC UTILITIES

BACKGROUND OF THE INVENTION

1. Field of the Invention

The present invention generally relates to computer systems for scheduling the generating units of electric utilities and, more particularly, to a computer implemented process which, given (1) a set of load forecasts on the electric system, (2) a prediction of trading transactions that may take place within the next few days, (3) a description of the physical properties of the generating units, (4) an estimate of spot prices, and (5) fuel prices associated with load forecasts, provides generation levels, fuel usage and prices at which power can be traded.

2. Background Description

Electricity is an essential part of our lives. If we took a moment to think of the services that would not exist if electricity were not here, we would be amazed. Almost every aspect of our modern lives involves electric power; from light bulbs and television sets to hospitals and auto industries. Although we are used to having power whenever we need it, the processes and systems involved in delivering electricity require careful planning and sophisticated mathematical and forecasting models.

Lately, due to rising costs of energy and discrepancies in its price among different regions of the country, the legal framework surrounding the electric-power industry has changed. This change has opened the door for utilities to compete with each other and against independent suppliers regardless of their geographic location. Although this change will benefit the consumer, utilities are going to face a highly unpredictable market and will need to make tough decisions regarding power generation and delivery.

Depending on the fuel used, electric-power generators of a utility may be categorized into thermal, nuclear, and hydroelectric. In general, a thermal unit uses a boiler that generates steam to drive a turbine. The turbine motion is then utilized to generate electric power. After cooling down, condensed steam (water) is pumped back into the boiler so that it can be heated again. Part of the power generated is used to drive a cooling fan and to run the system's pump. Both coal and oil can be used to fuel the boiler. To start a thermal generator quickly, natural gas is often used; then the system switches to the standard fuel. Note that the operations of a thermal unit are similar to those of a locomotive. The output of a thermal unit is a function of the heat generated in the boiler. Given that there is a limit to the amount of fuel that can be burnt during one hour, a thermal generator has a maximum generation capacity, G. Generating enough steam to drive the turbine requires a minimal amount of fuel which depends on the generating-unit's physical properties. Hence, we expect the minimum output of a generator, g, to be significantly greater than zero. To start a generator, the boiler must first be heated to the level at which it starts producing steam. The cost of the fuel used in heating the boiler is called the "start-up" cost. Note that this cost is not associated with any electric-power output.

FIGS. 1A and 1B present the relationship between the heat input to a generator and its electric-power output. The heat input is measured in British Thermal Units or BTU. The curve in FIG. 1A representing the electric-power output (MWH) is usually a second-degree polynomial in heat input. As expected, this function is increasing; i.e., as we burn more fuel we expect to generate more electricity. One can use the curve in FIG. 1A to compute the average heat input per MWH or the "unit heat-rate curve". Note that the unit heat-rate curve shown in FIG. 1B starts at a maximum rate (BTU/MWH) and declines as the load increases. This reflects the fact that the unit's efficiency increases as we increase the load towards the middle of the operating range. The efficiency usually declines after a certain load, x. To translate the curves of FIGS. 1A and 1B into a relationship between the load on a generator and the cost, one can multiply the cost per BTU ($/BTU) by the functions of FIGS. 1A and 1B.

The other classes of generators, nuclear and hydroelectric, use similar concepts to generate electricity. In the case of nuclear units, a radioactive material is used to run the reactor; while in the case of hydroelectric units, a water stream is used to push the turbines. Note that thermal and nuclear units require a lead-time (two hours or more) to start generating power. Given that there might be an urgent need for power, utilities maintain quick-start generators for unusual circumstances. These units use natural gas to heat air, not water, which is then used to push a small turbine. Clearly, these units have a smaller generating capacity than thermal units and are not as efficient. However, they have a very short start-up time (ten minutes or less) because the energy required to heat air is less than that needed to heat water. The quick-start generators are similar in their operations to jet engines.

In terms of operations, generators can be classified into three categories: "must-run units", "cyclers", and "peakers". Must-run units need to be running all the time. There is a number of reasons for this. One example is that of nuclear units. The time and energy required to start them are costly which makes switching them on and off economically infeasible. Another example is when a utility goes into a contractual agreement with a generating plant which results in continual running for a certain period.

The second category of generators is cyclers. These are units that are switched on and off depending on need. To avoid damaging these units, once a unit has been switched on, it must remain running for a minimal time duration (four to forty-eight hours). A similar constraint holds when a generator is switched off; it has to be given enough time to cool down (four to forty-eight hours). In general, starting up a cycler may take two to twenty-four hours depending on the unit. If power is needed urgently, a utility uses peaking units. These are the quick-start units mentioned above. They are costly but necessary to maintain a reliable system that can deliver power under any circumstances.

The generated electric-power is carried across transmission lines to the different points of usage or delivery points. Examples of delivery points are a city or a large factory. Whenever electric power is transmitted, part of it is lost. To maintain a reliable service, a utility must generate, at any moment, enough electricity to meet the demand of its customers plus losses incurred in power transmission. Note that exceeding customers' need increases the cost of operating the system and may cause power outages due to overloading some power lines. Given that power usage at any delivery point fluctuates continually, the problem of controlling the load on each generator while meeting the demand requires sophisticated tools.

To increase the reliability of an electric-power system, transmission lines of different utilities are connected with each other at certain points. These connections allow one utility to borrow power from another utility if needed. For example, a generator may fail suddenly resulting in shortage of generation. Being connected to neighboring utilities, the burden of generation loss is shared with others. Of course, the utility that suffered a generator loss must start another unit as quickly as possible or take action to compensate for this loss.

To meet customers' demand, a planner predicts the electric load on the system for the following week. The forecast is given in the form of total load per hour. That is, it gives the expected load at each hour for the next 168 hours. Electric utilities apply advanced statistical models to the weather forecast for each region they serve, load data from previous years, and load data from last week; and use intuition to produce an accurate forecast. Using the load forecast, a utility schedules its generating units for the next 168 hours. By scheduling, what is meant is deciding when each generator should be on or off during the week. The schedule also indicates the load on each generator in the system at each hour. To minimize the cost of operating the system, a utility attempts to find a schedule that meets the load at a minimal cost. It is important to note that the resulting schedule must take into consideration all constraints imposed by the system, such as minimum up-time and minimum down-time, which makes the scheduling task notoriously hard. The problem of finding a minimal cost schedule for the generating units is known as the "unit commitment problem".

To maintain high reliability in the electric system, a utility refines its load forecast every eight hours and solves, using the updated forecast, a new unit commitment to adjust the schedule. The new schedule must respect all constraints imposed by the previous one. For example, if a unit, that has a minimum up-time of eight hours, was switched on two hours before revising the schedule, the revision must make sure that this unit runs for at least another six hours even though this unit may not be needed. Clearly, such inefficiencies may arise if the load forecast changes significantly due to unexpected elements such as a sudden change in weather patterns or generator failure.

For a more detailed discussion on the subject of power generation and transmission, see A. J. Wood and B. E. Wollenberg, *Power Generation, Operation, and Control*, John Wiley, 1996.

The power industry is now going through deregulation. The current picture of a single utility controlling the market in a specific region will soon disappear. Instead, there will be power producers who sell their production to a power pool; and power suppliers who will buy power from the pool and sell it to their customers. Although the full picture of the power industry after deregulation is not yet known, it is clear that utilities need to prepare themselves for an open market in which buying and selling power are to be considered when the schedule of the generating units is created.

The main reason behind deregulation is the high price of electric energy. The first step towards deregulation was taken in 1978 with the passage of the Public Utilities Regulatory Policy Act. This act encouraged non-utility generation and required utilities to buy power from independent generators. The Energy Policy Act of 1992 took deregulation a step further by mandating open access on the transmission system for wholesales.

Currently, electricity is sold as a service that is delivered at specified points. For example, each one of us expects to receive electric power through a meter outside the house. We also pay for this service regardless of its producer or which power lines it followed. That is, the electricity bill indicates the total usage of electricity in KWH and the service price per KWH without incorporating any other details into the pricing scheme. Deregulation is changing this picture by un-bundling the electric power into generation and transmission. One will pay a production cost and a transmission fee. There will be several power suppliers from whom electric power may be purchased. Suppliers may have different pricing mechanisms. For example, there might be a discount for using power off-peak periods or for signing a long-term contract with the supplier. Power producers will compete with each other to minimize their costs so that they can sell their product to more customers and maximize their profit.

On the other hand, power transmission will remain regulated for the time being. The reason for that is to maintain a reliable system. The transmission lines in each state or region will be controlled by an independent entity called Independent System Operator or ISO. One of the ISO responsibilities is to settle financially with the parties involved in transmitting electric power. The transmission cost depends on the proximity of the supplier and the congestion of the transmission lines as well as other operational factors. To maintain a reliable system, ISO announces, 24 hours in advance, the load forecast on the system and asks interested suppliers to submit bids. The ISO then holds an auction to determine which suppliers to buy power from. Note that suppliers who submit a bid with a high price may end up not selling any of their production. On the other hand, selling power at a low price may not create enough revenue for a generator. Given that no one knows in advance the amount of power that competitors may bid for, the electric-power market will become more uncertain and risky.

The hope is that deregulation will result in cheaper prices and improve the overall economy by encouraging investments in electric utilities. The size of the electric industry is expected to grow after deregulation as was the case with the telecommunications industry. In the case of telecommunications, industry revenue shot up from $81 billion to $170 billion in ten years.

On the other end of the spectrum, due to deregulation, the load on a utility system is becoming increasingly unpredictable. The reason is trading transactions that change the load pattern significantly. Some utilities, for example, may sell more than 30% of their power generation to other utilities on certain days. Demand and supply in the market are functions of volatile electricity prices which in turn depend on highly unpredictable elements such as weather conditions around the country and fuel prices which may vary within a wide range.

SUMMARY OF THE INVENTION

It is therefore an object of the invention to provide a computer risk-management system for scheduling the generating units of an electric utility.

It is another object of the invention to provide computer implemented process that manages generating units of an electric utility which handles multiple fuel, fuel constraints, varying fuel prices, power trading, and load uncertainty.

The invention provides a computer implemented process for scheduling the generating units of a utility while taking into consideration power trading with other utilities and the stochastic load on the system. The system allows the user to provide multiple load forecasts and to vary the fuel price between the different scenarios and the different periods of the planning horizon. The tool allows the user to model accurately the uncertain trading transactions and the changing fuel prices. Given (1) a planning horizon, (2) a set of electric-load forecasts and fuel prices, (3) a full description of the properties of the electric-power generators, (4) reserve requirements for the system, (5) an estimate of the price of electricity in the open market at each hour of the week, and (6) a set of possible trading transactions for the next two to seven days, the goal is to meet the electric demand of customers at a minimal cost while making the maximum profit possible from power trading. To do so, a mathematical model of the problem is solved using appropriate optimization techniques. The solution provides the status of each generator at each time period of the planning horizon under each given scenario. By "status of a generator", what is meant is whether it is on or off. The solution also provides the load on each generator during each period in which it is operating, an optimal fuel mix for each generating unit, and the prices for purchasing and selling power in the periods of the planning horizon. The technique used to solve the model provides information regarding the sensitivity of the solution to the input parameters and other valuable information to the decision maker.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is a tool that can be used to schedule the generating units of an electric utility while taking power trading and fluctuation in fuel prices into consideration. This tool mixes traditional techniques used in scheduling generators of an electric utility with hedging strategies that are widely used in the finance industry. The result is a robust generating schedule.

Figure 2:
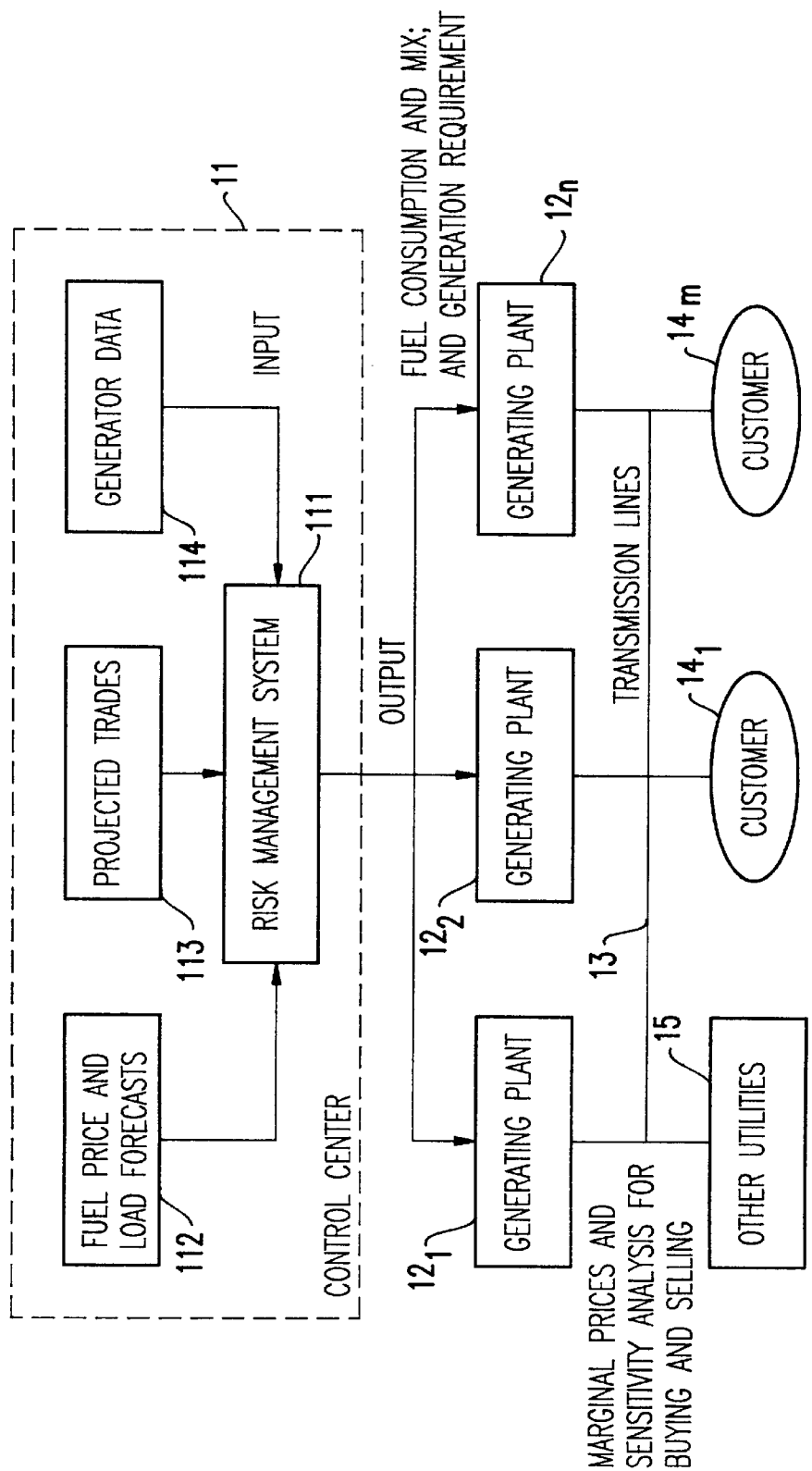
FIG. 2 is a block diagram showing the relationship between the risk management system according to the invention and the generators of a utility.
Figure 3:
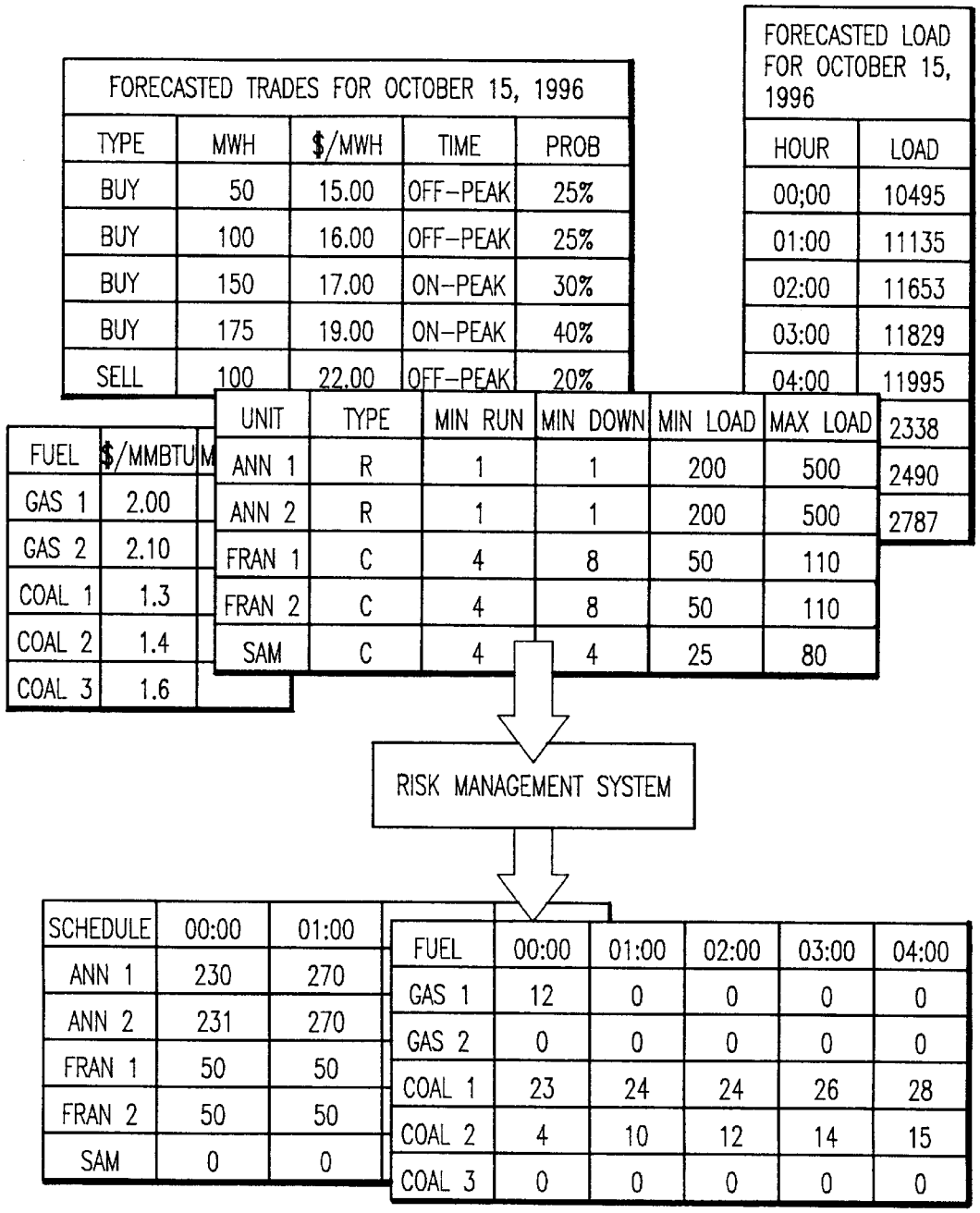
FIG. 3 is an illustration of input and output of the risk management system according to a preferred embodiment of the invention.

FIG. 2 is a block diagram showing the relationship of the risk management system tool according to the invention and the generators of an electric utility. The tool 111 is part of a control center 11 and receives as inputs fuel price and load forecasts 112, projected trades 113, and generator data 114. The output of the tool 111 is the fuel consumption, fuel mix, and generation requirement to each of a plurality of generating plants $12_1$ to $12_n$ which are connected to transmission lines 13 for delivery of electrical power to customers $14_1$ to $14_m$ and to other utilities 15. The inputs and output of the risk management system 111 are illustrated in FIG. 3 in the form of spreadsheets.

Here there is introduced the notion of non-anticipativity because of its frequent use in the following sections. The model that is used in the following description is a multi-stage mathematical program with varying right-hand side. By "multi-stage", what is meant is a model in which decisions are made sequentially over a certain planning horizon. The "varying right-hand side" reflects uncertainty in some of the system parameters. In the case of power generation, the electric load on the system (which appears in the right-hand side of some of the constraints) is unknown in advance.

One can approximate the uncertainty in the right-hand side using a set of scenarios each of which has a probability that reflects its importance or likelihood. The stochastic program becomes that of minimizing the expected cost of operating the electric system under the given scenarios. A feasible solution for this stochastic program must satisfy the non-anticipativity or bundle constraints. Non-anticipativity states that if two different scenarios, s and s', are indistinguishable at time t on the basis of information available about them at time t, then the decisions made for s and s' must be the same.

To further clarify the concept of scenario bundles and their impact on decisions, an example from the finance industry is used. Assume that we want to invest $1,000 so that the return after three years is maximized. To simplify the model, we assume that there are two possible investments, stocks and bonds, and that we can reallocate money from one investment to another by the end of each year. One way to model this problem is by using scenarios to represent the future returns on investments. That is, we study the market and come up with annual return rates for both investments (stocks and bonds) over the three years of the planning horizon. The scenarios are described in Table 1.

TABLE 1

|  | Year 1 | | Year 2 | | Year 3 | |
| --- | --- | --- | --- | --- | --- | --- |
| Return | Stocks | Bonds | Stocks | Bonds | Stocks | Bonds |
| Scenario 1 | 10% | 5% | 8% | 7% | 4% | 12% |
| Scenario 2 | 10% | 5% | 8% | 7% | 3% | 12% |
| Scenario 3 | 10% | 5% | 7% | 12% | 6% | 5% |
| Scenario 4 | 10% | 5% | 8% | 8% | 12% | 3% |
| Scenario 5 | 6% | 9% | 8% | 8% | 12% | 5% |

To maximize the expected return, our investor must allocate the $1,000 between stocks and bonds. To do so, he or she uses an (stochastic) optimization to develop a decision tree for the future. The decision tree indicates where to invest in the beginning of the first year and how to reallocate the funds by the end of each year. The reallocation is a function of the return values observed during a year. For example, if we observe a return of 10% on stocks and 5% on bonds in the first year, then we know that Scenario 5 is out of the picture and that the future decisions are based on scenario 1, 2, 3, and 4. At this point (end of year 1), the decisions made for scenarios 1, 2, 3, and 4 must be the same. The fact that we must adopt similar decisions for these four scenarios is called "non-anticipativity" and the corresponding decisions are said to be "bundled". Let us take this example one step further and assume that we observe return rates of 8% and 7% in the second year. At the end of year 2, we know that the only two possible future scenarios are Scenario 1 and Scenario 2. The decision tree provides an investment decision for these two scenarios that is independent of the outcome of Year 3. Here again, we say that scenarios 1 and 2 are bundled at the end of Year 2.

The process described is implemented on a computer system for scheduling electric-power generators of a utility company. Given (1) a set of load forecasts on the electric system, (2) a prediction of trading transactions that may take place within the next 168 hours, (3) a description of the physical properties of the generating units and the expected spot market prices for electric power, and (4) fuel prices associated with load forecasts, our process provides for each scenario (1) generation levels, (2) fuel usage, and (3) prices at which power can be traded. This information is then used by decision makers and plant managers to run the electric system reliably. Our tool provides multiple decisions, e.g., generation, fuel consumption, and power prices, for each hour of the planning horizon. Each of these decisions is optimal under certain circumstances. The system administrator observes the market, then looks up the appropriate decision from a table provided by our tool.

What distinguishes the system of this invention from existing ones is the incorporation of fuel prices into the model and allowing these prices to vary. The invention also allows the user to impose constraints on fuel consumption. Incorporating fuel into the model requires iterating between a stochastic unit-commitment solver and a stochastic linear-programming model. The stochastic linear program allocates fuel optimally between the different generators of the system. The cost function of each unit is then constructed and a stochastic unit commitment is solved. The process is repeated until a convergence is reached.

The present invention provides a utility with a tool that promotes a better understanding of the relationship between the electric-power and fuel markets allowing a utility to hedge against uncertainty in both markets. This is done by modeling the customers' varying demand, the uncertain electric-power market, the generating units, the availability of different fuel, and the fluctuating fuel price in the open commodity exchange.

Here is a more accurate description of the input of this process.

1. The forecasted electric load on the system of the utility: This is the load generated by customers who fall within the utility's territory. Given load patterns observed in previous years and given load values for the past week, utilities use the weather forecast (temperature, humidity, sky conditions, and wind) to predict the load for the next week or 168 hours. All utilities have advanced tools and employ experienced planners to perform the forecasting task. Due to uncertainty in load, the user is allowed to provide a set of forecasts to better approximate the load distribution. The user also assigns a weight to each forecast. It is assumed that the load forecasts and their weights are given in the form of a computer file, e.g., a spreadsheet, on the hard disk of a computer system.

2. The physical and operational properties (specifications) of the generating units: Each utility maintains accurate information regarding the specifications of its generators. The description of each generating unit can be summarized using ten numbers: minimum operating capacity, maximum operating capacity, minimum up-time, minimum down-time, start-up heat requirement, shut-down cost, current status, and the heat-input versus power-output curve which requires three parameters. Again, it is assumed that this information is provided on the hard disk in the form of a table or a spreadsheet.

Figure 1B:
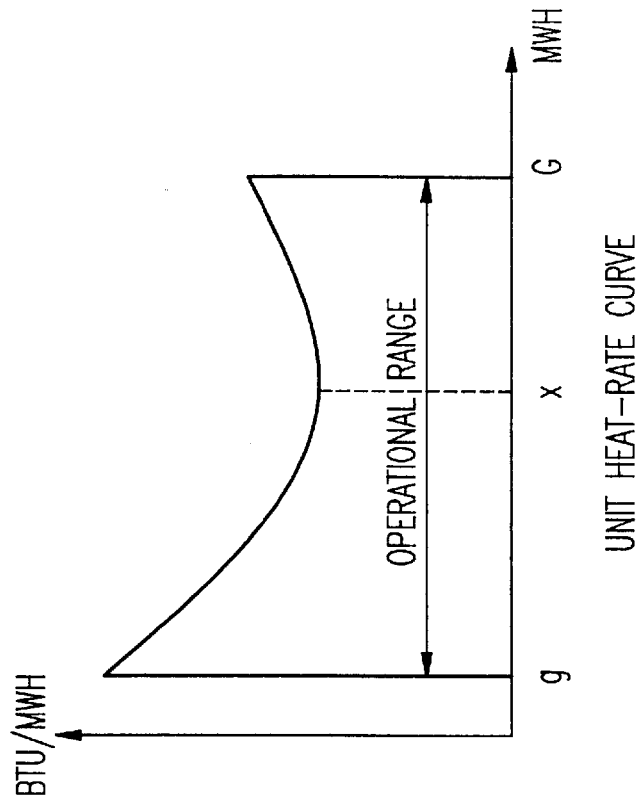
FIGS. 1A and 1B are graphs illustrating the relationship between heat input and electric power output.
Figure 1A:
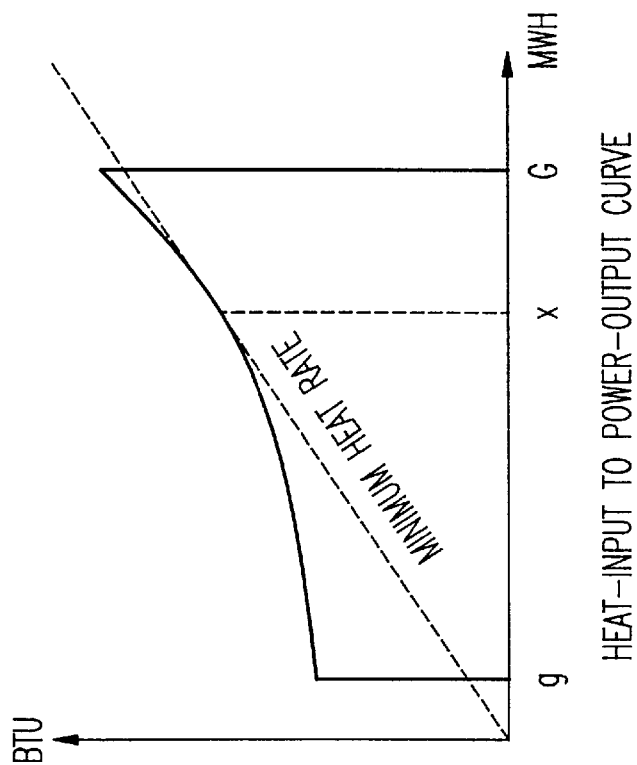

3. Fuel cost and its availability: To translate the curves of FIGS. 1A and 1B into cost, it is assumed the knowledge of the cost per BTU for each fuel used in generation (see FIGS. 1A and 1B and FIGS. 6A and 6B). This information is needed to compute the start-up cost and the operating cost of a generator. Our system permits the user to specify different cost/BTU for a fuel for different hours over the course of the week and for different load scenarios. This allows the user to change the prices of fuel to reflect his or her view of the spot-market. The user can also provide upper and lower bounds (and any other linear constraints) on the amounts of fuel that can be used at each hour or day. It is assumed that fuel information is stored on a computer disk and is accessible by our system. The linear constraints are also assumed to be stored on the disk in a tabular form or in the standard Mathematical Programming System (MPS) format described in IBM document number 4. The projected power-trading transactions in the market: A view of the market and what type of trading transactions may take place must be supplied by the user. For example, the user may indicate that there might be an offer to "buy 200 MWH at $20/MWH tomorrow on-peak with a probability of 10%" or a market to "sell 100 MWH at $25/MWH in two days off-peak with a probability of 25%." It is assumed that this information will be supplied in a computer file that is stored on the hard disk.

Given access to the previous data, our tool produces a table (spreadsheet) that indicates the load (MWH) on each unit at each hour of the week. This table is passed on to the administrators of each generator to be used as an operating schedule for the coming week. It also provides prices at which power is expected to be traded. As a result of the calculations, each plant manager is given precisely what type of fuel to use and how much to burn at each hour of the week. The tool can be used to perform a "what-if" analysis which helps the user in developing a better understanding of the relationship between the power market and his/her electric system; and in better quantifying the risk involved in buying and selling power in the periods to come.

The existing tools for scheduling electric-power systems use a single load forecast when searching for optimal decisions. Furthermore, they do not consider power trading in the model. In other words, existing tools assume that future loads are known in advance which results in conservative schedules. What distinguishes our tool is that it allows the user to incorporate risk, through predictions of the load and fuel prices, and uses these predictions to create optimal schedules. Our tool uses hedging strategies to produce robust schedules that minimize cost and manage risk efficiently.

The idea of using multiple scenarios to approximate uncertainties in the load forecast was suggested in A.

Carpentier, G. Cohen, J. C. Culioli, and A. Renaud, "Stochastic optimization of unit commitment: A new decomposition framework," *IEEE Transactions on Power Systems*, 11(2):1067–1073, May 1996, and in Takriti, Birge, and Long, "A stochastic model for the unit commitment problem," *IEEE Transactions on Power Systems*, 11(3): 1497–1508, August 1996. However, both models assume that fuel prices are known in advance and are fixed over the planning horizon.

Figure 4:
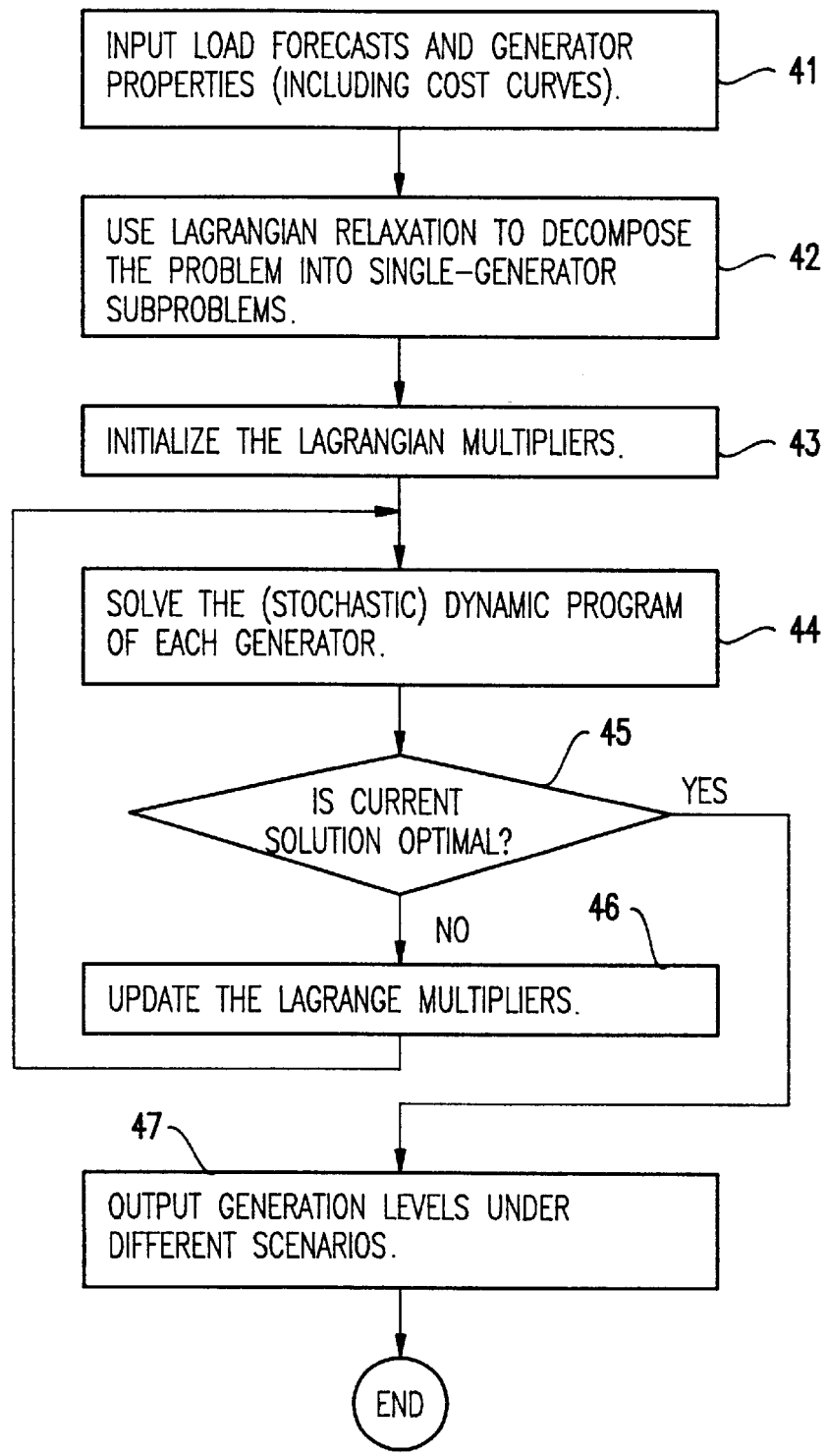
FIG. 4 is a flow diagram of a stochastic model for determining generation levels under different conditions.

FIG. 4 is a flow diagram illustrating the stochastic model of Carpentier et al. Load forecasts and generator properties are input in function block 41. Then, using Lagrangian relaxation, the problem is decomposed into single-generator subproblems in function block 42. Lagrange multipliers are initialized in function block 43 prior to entering a processing loop. In the processing loop, the stochastic dynamic program of each generator is solved in function block 44 and, after each solution, a test is made in decision block 45 to determine if the current solution is optimal. If not, the Lagrange multipliers are updated in function block 46, and the process loops back to function block 44. When an optimal solution is obtained, the generation levels under different scenarios are output at function block 47. Carpentier et al. do not discuss issues related to the practicality of their model and do not report computing requirements and execution-time for their technique.

Figure 5:
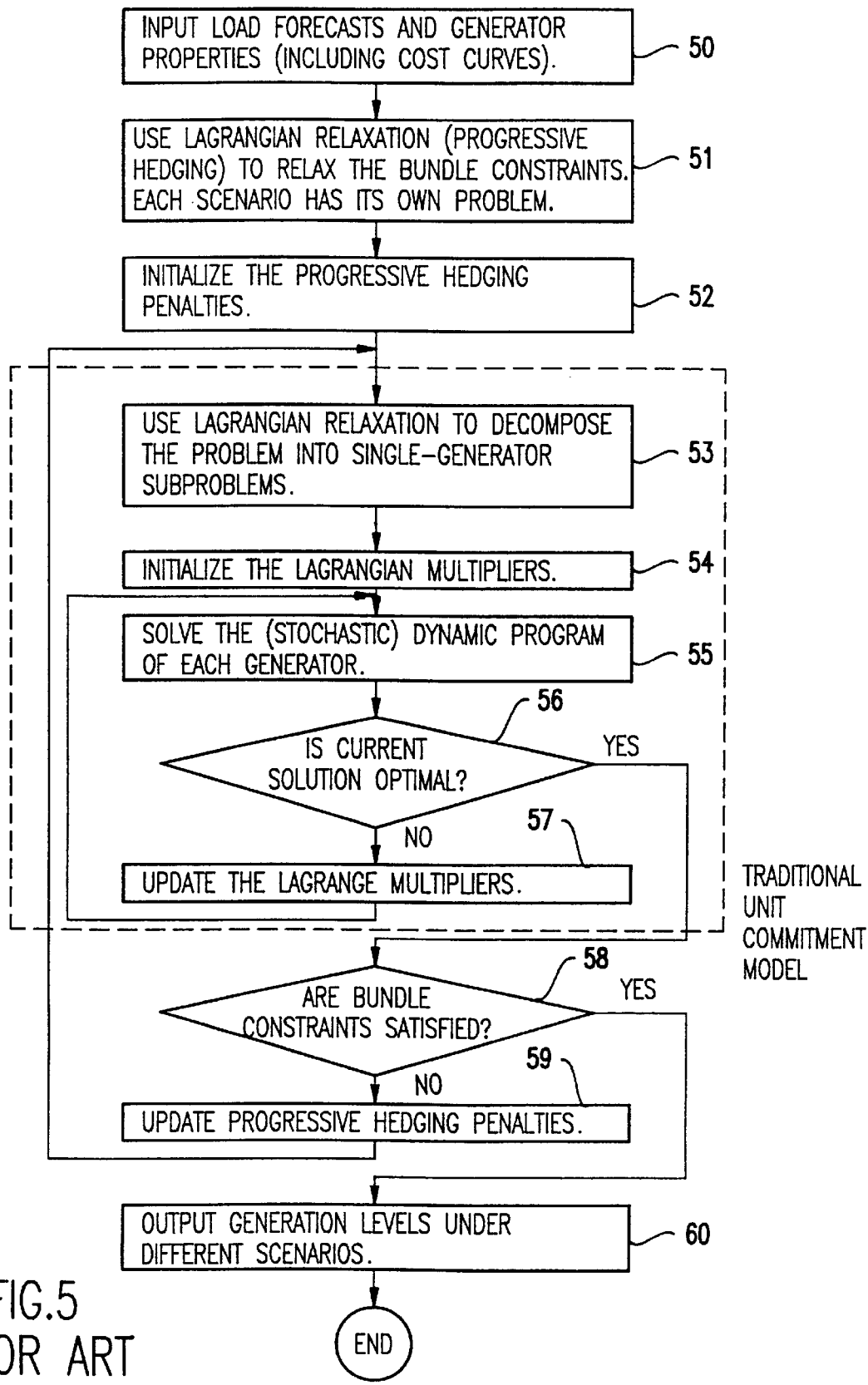
FIG. 5 is a flow diagram of another stochastic model for determining generation levels under different conditions.

The flow diagram for the stochastic model of Takriti et al. is shown in FIG. 5. The load forecasts and generator properties are input in function block 50. Lagrangian relaxation is used in function block 51 to relax the bundle of constraints. In this case, each scenario has its own problem. Progressive hedging penalties are initialized in function block 52 before entering the processing loop. In the processing loop, Lagrangian relaxation is used in function block 53 to decompose the problem into single-generator subproblems. Then, a subprocessing loop is entered beginning with initialization of the Lagrange multipliers in function block 54. The deterministic dynamic program from each generator is solved in function block and, after each solution, a test is made in decision block 56 to determine if the current solution is optimal. If not, the Lagrange multipliers are updated in function block 57 and the process loops back to function block 55. When the current solution is optimal as determined in function block 56, a further test is made in decision block 58 to determine if bundle constraints are satisfied. If not, the progressive hedging penalties are updated in function block 59, and the process loops back to function block 53. When the bundle constraints are satisfied, the generation levels under different scenarios are output at function block 60. Takriti et al. use a parallel machine with thirty-two nodes to handle the large size of their model. Given that a comprehensive model has a significantly larger size than the examples of Takriti et al. and that a parallel platform is very costly, this technique may be hard to apply.

The system according to the present invention builds on Carpentier et al. and Takriti et al. but uses different mathematical techniques to accelerate the process of solving the model and to make it more general. To be more specific, the present invention implements:
1. A storage scheme for the scenario tree and bundle constraints: The result is significant reduction in calculations and storage requirements.
2. A new updating mechanism for the Lagrange multipliers of the stochastic unit commitment problem: the bundle trust-region method is used.
3. A clear and concise treatment of power trading.
4. A flexible operating range: the operating range is allowed to be a function of time which allows incorporating maintenance into the unit commitment. Generators are permitted to have a varying capacity when they are turned on (ramping).

The resulting system is a practical tool that runs efficiently on any computer platform and under any operating system, including parallel computers. Parallelism reduces the system's execution time (approximately) proportionally to the number of available processors. Given that the market profile may change quickly, solving the model in parallel permits the system administrator to respond efficiently to the dynamic market.

System's Input

First, there is discussed the input parameters required for the model of the present invention. The duration of the planning horizon is how far ahead we want to look so that our present decisions are close to optimal. A planning horizon varies from three to seven days depending on the utility. The planning horizon is divided into periods. Usually, each period is one hour. Our model assumes that the number of periods, T, is supplied.

Second, planners must provide load forecasts (MWH) for each period of the planning horizon for the region covered by the Utility. Presently, all utilities employ trained individuals to produce reasonable forecasts. There are also special forecasting packages that are widely used by utilities. The forecast is a function of the weather in the region of interest, time of day, day of year, and many other factors. Methods for developing load forecasts are not discussed here. It is assumed that a set of S load forecasts is provided.

Each forecast (scenario) provides the total load, $d_t^s$, on the system at each time period, t=1, . . . , T, of the planning horizon. The superscript s indicates that a variable or a parameter is associated with forecast s. For example, $d_2^4$ is the total load on the system at time period 2 under scenario 4.

A weight, $p_s$, is associated with each scenario, s, to approximate the likelihood of its occurrence in the future. If $p_s > p_{s'}$, then we are more likely to observe scenario s than to observe scenario s'. If $p_s = 0$, then scenario s cannot occur, and we can drop it out of our scenario set. Note that $$\frac{p_s}{\sum_{s'=1}^{S} p_{s'}}$$

represents the probability that scenario s occurs. Table 2 gives an example of load forecasts.

TABLE 2

| | | Load on our Utility, $d_t^s$ | | | | |
|---|---|---|---|---|---|---|
| | $p_s$ | t = 1 | 2 | 3 | 4 | 5 |
| s = 1 | 0.35 | 10495 | 11135 | 11653 | 11829 | 11995 |
| s = 2 | 0.56 | 10846 | 10982 | 11563 | 11674 | 12039 |
| s = 3 | 0.09 | 11138 | 11956 | 12310 | 12388 | 12583 |

To reflect uncertainty in fuel prices, the user is allowed to provide different prices for a fuel, j, over the different points in time, t, and under the different load scenarios, s. The price of fuel j is denoted by $$h_{i,j}^s \left(\frac{\$}{BTU}\right).$$

Given that the goal is to minimize the expected cost of running the electric system, the expected value of fuel cost over scenarios that belong to the same bundle can be used. That is, if $\Omega$ is the set of scenarios that satisfy the condition $d_{ts}=d_{ts'}$ for any s and s' in $\Omega$ and for $t=1, \ldots, \tau$, then the expected value $E_{s \in \Omega}(h_{t,j}^s)$ can be used as the cost of fuel j at time $t=1, \ldots, \tau$ under the scenarios of $\Omega$.

Third, the model requires a complete description of the generating units of the utility. By a "complete description", what is meant is providing the total number, N, of generators in our system and the operational properties of each generator. That is, for each generator, $i \in \{1, \ldots, N\}$, the user must provide:

(a) Operational Range: This is represented by the minimum power, $g_{i,t}$, and the maximum power, $G_{i,t}$, that can be produced by this generator during period t. Clearly, $g_{i,t}$ and $G_{i,t}$ must satisfy the constraint $0 \leq g_{i,t} \leq G_{i,t}$. When it is on (during period t), a generator, i, can produce any amount of power in the range $[g_{i,t}, G_{i,t}]$. Note that the operational range depends on the time t. Although, the minimum and maximum operating capacity for a generator are not affected by time, t is incorporated to allow considering maintenance in the model. For example, if a unit i is scheduled for maintenance over a certain time range, then its capacity over this range can be reduced or made zero (it is not always necessary to shut down a unit during maintenance).

In some cases, a unit cannot operate at its maximum capacity immediately after it is started. For example, when the load reaches $g_{i,t}$ (or some other level), it must be kept at that level for a few periods (usually two hours). Such limits are applied directly to the states of the dynamic program of each generating unit.

Note that we can allow $g_{i,t}$ and $G_{i,t}$ to vary under different scenarios in the model. However, there is no need for such flexibility in practice.

(b) Heat-input versus Power-output Curve: This is the curve that represents the relationship between the heat in the burner and electric-power output (see FIGS. 1A and 1B). This curve is denoted by $f_i^h$ where $i \in \{1, \ldots, N\}$. In other words, to generate x units of power (MWH), the burning fuel must provide $f_i^h(x)$ thermal units (BTU). The function $f_i^h$ is quadratic, convex, and increasing. It can be fully described by providing three parameters: $a_i$, $b_i$, and $c_i$. That is, the heat required to produce x units of power for one period using generator i is $a_i x^2+b_i x+c_i$. To guarantee that $f_i^h$ is convex and increasing, the parameters $a_i$, $b_i$ and $c_i$ must satisfy $a_i>0$, $-0.5 \, b_i/a_i \leq g_{i,t}$ if $a_i>0$, $b_i \geq 0$ if $a_i 0$, and $a_i g^2_{i,t}+b_i g_{i,t}+c_i \geq 0$.

Figure 6B:
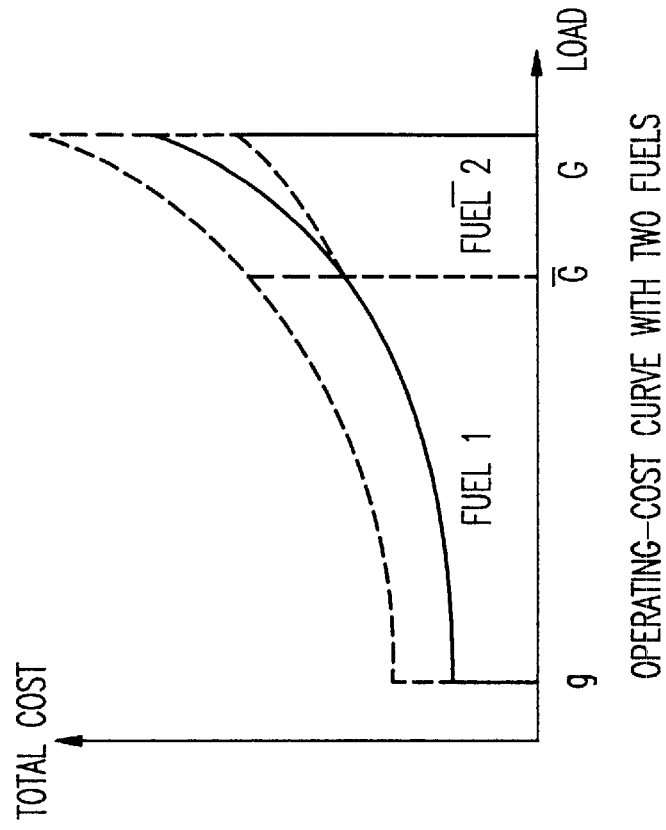
FIGS. 6A and 6B are graphs showing examples of a heat-input versus power-output curve and the corresponding generator cost function.
Figure 6A:
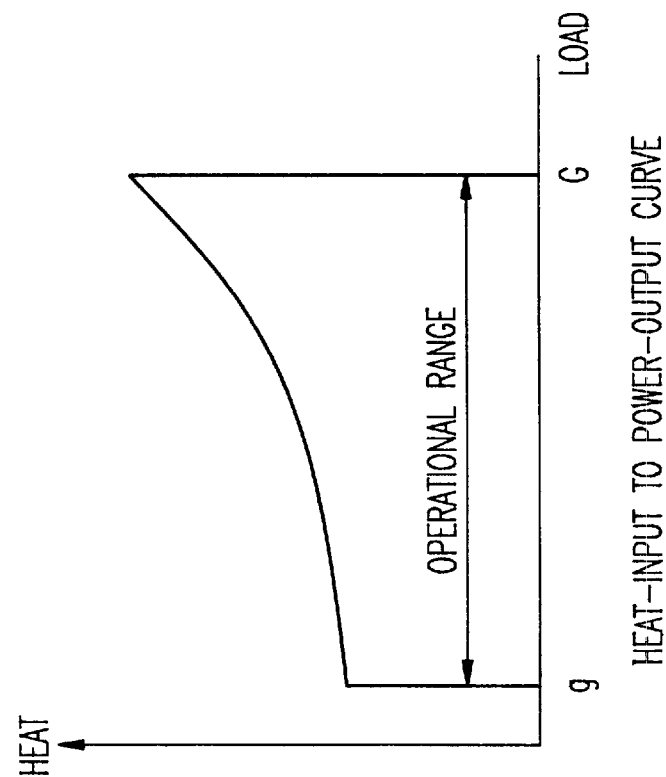

The cost function of generating electricity on generator i is denoted by $f_{i,t}^s$. Although $f_i^h$ is a quadratic function, the function $f_{i,t}^s$ may not be quadratic. The reason is that when the upper capacity, $G_{i,L}$, is approached, a generator usually requires a more combustible fuel. Some generators, for example, require the use of natural gas in addition to coal when the load exceeds 80% of $G_{i,t}$. As a result, the generating cost curve must combine the cost curves of both fuels. FIGS. 6A and 6B show an example of a cost function $f_{i,t}^s$.

The generation levels at which we switch fuel is denoted by $\overline{G}_{i,t}^k$, $k=1, \ldots, K$, where K+1 is the total number of different fuels (excluding the start-up fuel) used on i. The values of $\overline{G}_{i,t}^k$ are assumed to be known for each generator. The cost function $f_{i,t}^s$ can then be constructed from the quadratic cost functions of the individual fuels. Given that we switch from a cheap fuel to a more expensive one as we increase the load, the function $f_{i,t}^s$ is convex which makes the task of minimizing it a simple one. From here on, it is assumed that the cost function, $f_{i,t}^s$ (x) is convex and increasing and that $f_{i,t}^s(g_{i,t})>0$. It is our experience that cost functions faced in power generation fall within this class of functions. Hence, our assumption does not pose any limitations on the applicability of this technique. It is also assumed that we have a tool for finding the minimum of $f_{i,t}^s(x_{i,t}^s)-\lambda_t^s x_{i,t}^s$ over the range $[g_{i,t}, G_{i,t}]$ where $\lambda_t^s$ is a non-negative real number. Since $f_{i,t}^s$ is convex, the previous minimization is trivial.

(c) Minimum Up-time and Minimum Down-time: When a generator is switched on, it has to remain on for at least $L_i$ periods and when it is switched off, it has to remain off for at least $l_i$ periods. Note that if either of these two constraints does not exist, one can set the corresponding parameter to zero. For example, if there is not a minimum up-time requirement on a generator, i, then $L_i$ can be set to 0 and the constraint is dropped. The values of $L_i$ and $l_i$ must be non-negative integer for all $i \in \{1, \ldots, N\}$.

(d) Start-up and Shut-down Costs: A generator must be warmed up for a number of periods before it starts generating electricity. The cost of fuel (usually, natural gas) used at this stage is called a start-up cost. It is a function of the heat, $SU_i^h$ BTU, required to warm up the unit and the price, $$h_{i,j}^s \left(\frac{\$}{BTU}\right),$$

of the heating fuel during the warm-up period. The start-up cost is denoted by $SU_{i,t}^s$. A shut-down cost, $SD_{i,t}^s$, is incorporated in the model. Most utilities set $SD_{i,t}^s$ to zero.

(e) Status of Each Generator Prior to the Beginning of the Planning Horizon: Given the minimum up-time and minimum down-time constraints, we need to know for how long a generator has been up or down prior to the first period. The reason for that is to make sure that we satisfy minimum up-time and down-time constraints at the beginning of the planning horizon.

(f) Classification of Generators: Generating units are usually divided into different classes. Some units are classified as "must-run units". As the name indicates, these units are functional all the time and we do not need to worry about scheduling them. An example of such units are nuclear generating units. Another class is the "cycling units". These units are switched on and off during the planning horizon depending on the load on the system. A third class is "speakers" that are used during emergencies and high-demand periods. Finally, we have the "unavailable" units. These are units scheduled for maintenance or unavailable for other reasons. Knowing the types of units helps accelerating the solution procedure.

(g) Loss Factors: To consider losses in transmission lines, one can use a loss factor for each unit to adjust its production. For example, if the average transmission losses for a unit is 9%, then one can apply a reduction factor of 91% to the production of this unit. Note that these factors can be incorporated simply by multiplying the heat curve of a unit by a constant that depends on its penalty.

Fourth, to avoid any blackouts, utilities make sure that, at each period, the maximum operating capacity of their system exceeds the demand of this period by a certain amount. This excess capacity is called "spinning reserves". To clarify the concept of spinning reserves, assume that our system has ten generators of which seven are on line at the current time period. Let us also say that the forecasted demand at this period is 12,000 MWH. In an optimal solution, the total generation would be close to 12,000 MWH. However, if the maximum capacity of our operating units; i.e., the total capacity when each unit is operating at $G_{i,t}$, is close to 12,000 MWH, our system cannot take any unexpected increase in the demand. In other words, the reliability of our system is low. The reliability can be improved by forcing the total maximum capacity of the operating units to exceed the expected demand by a certain amount of power. This excess capacity is the spinning reserves and is indicated by $r_{ts}$. There are other reserve constraints that can be enforced to improve reliability. The treatment of such constraints is very similar to our treatment of spinning reserves.

Fifth, to incorporate trading transactions, the user of our system must provide his or her view of the future power market. Using the weather forecast and information that may influence power usage in other regions of the country, power traders estimate the price of buying or selling power in the market and the quantities that may be offered for trading. The projection of trading transactions is performed for the next two to seven days. The tool according to the invention uses four parameters to describe a transaction. These parameters are: amount of power, v(j) MWH; price per unit, $\zeta_j$ $/MWH; the probability, $\pi_j$, that such a transaction may take place; and the delivery time of the transaction. The delivery time of a transaction indicates the date and time at which power will be delivered. The delivery time can be on-peak (between 7:00 a.m. and 10:59 p.m.) or off-peak (between 11:00 p.m. and 6:59 a.m.). Weekends are considered off-peak.

Currently, a utility uses the information outlined above as the first, third and fourth in addition to a single load-forecast from the second to generate a reasonable schedule for its generating units. In many cases, the effect of fuel on a generator's cost function is approximated and fuel constraints are ignored. The multiple forecasts of the second and the uncertain nature of trading transactions and fuel prices are yet not incorporated into generation in the power industry.

Solution Technique

Figure 7:
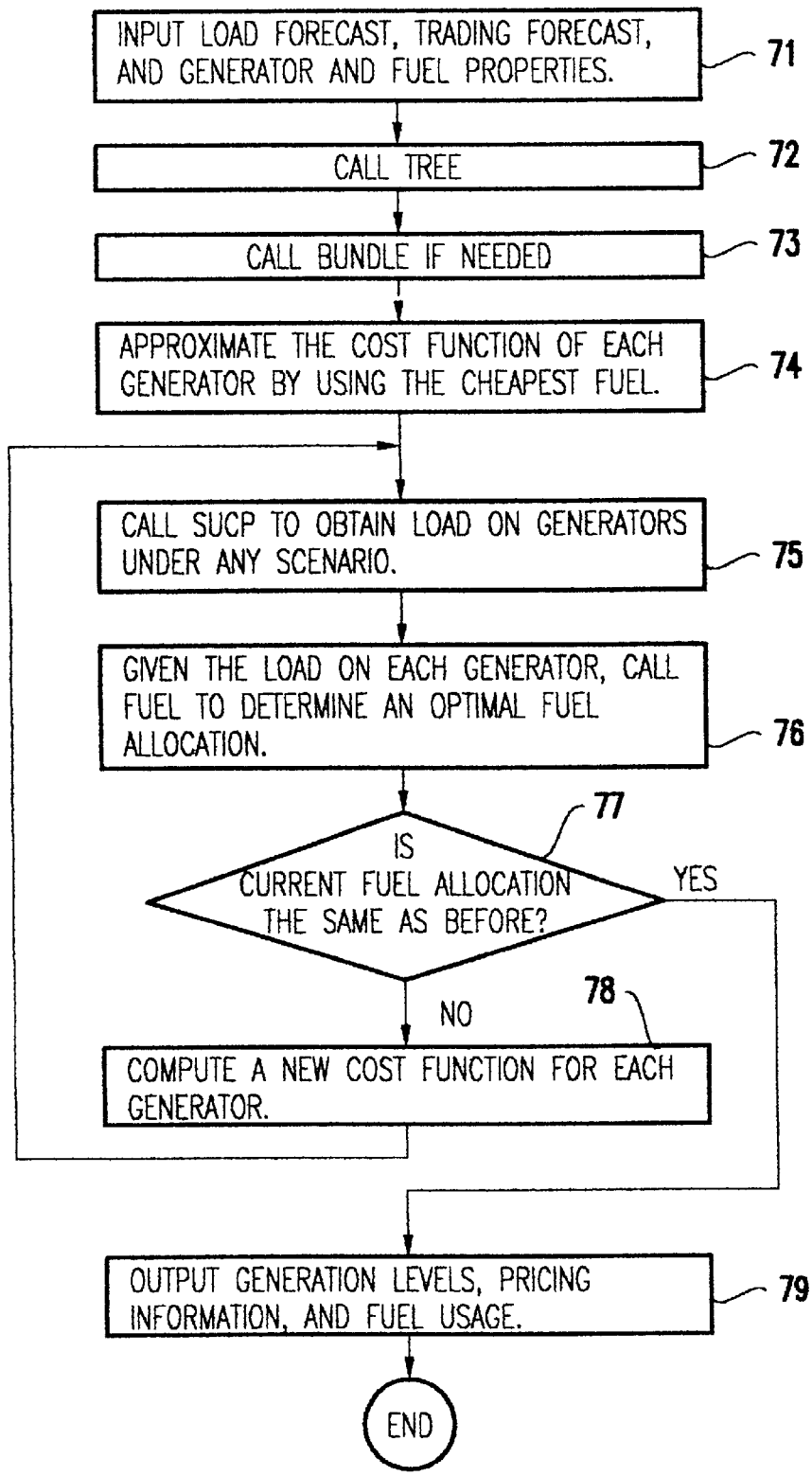
FIG. 7 is a flow diagram of the overall operation of the risk management system according to the invention.

The overall structure of the risk management system according to the present invention is shown in the flow diagram of FIG. 7. Load forecast, trading forecast and generator and fuel properties are input in function block 71. The first step in processing the input data is to generate load scenarios. These scenarios are a result of applying power-trading contracts to the original load forecasts. The resulting scenario tree approximates future uncertainties in load and trades. The probability of each scenario is computed by multiplying the probabilities of the trades with those of the load forecasts. Scenarios with relatively small probabilities are eliminated and their probabilities are distributed among other scenarios. The scenarios are generated by calling the procedure TREE in function block 72. Procedure TREE is described in more detail below. In some cases, the user may provide a scenario tree which must be processed to define the bundle constraints. Recall that two scenarios are members of the same bundle at time t if their loads are the same up until t. Thus, if needed, the procedure BUNDLE is called in function block 73.

Using the fuel available for consumption by each generator, i, we compute, in function block 74, an approximate value for the cost per BTU or $\bar{h}_{i,t}^{s}$ (recall that a generator may use more than one fuel at any time period). An easy way is to use the fuel with the least cost as an estimation of $\bar{h}_{i,t}^{s}$, then update this value (as in function block 78). In this way, the cost function, $f_{i,t}^{s}$, of generating a MWH of power on generator i is obtained by multiplying $f_i^h$ by $\bar{h}_{i,t}^{s}$.

A processing loop is now entered which begins by calling the procedure SUCP in function block 75 to obtain the load on each generator under any scenario. Given $f_{i,t}^{s}$, a stochastic unit-commitment model is solved. As a result, the generation of each unit at each time period (under the different scenarios) is obtained, and this can be used to compute the heat-input needed for each unit throughout the planning horizon. Then given the load on each generator, the procedure FUEL is called in function block 76 to determine an optimal fuel allocation.

To satisfy the required heat input for each generator, a linear program is solved in which the decision variables are the amount of fuel burnt on each unit at each time period. Of course, our decision variable has a component for each possible fuel in the model. The linear program is solved subject to the constraint that fuel fed to a generator must be sufficient to generate the heat needed. It must also consider non-anticipativity and other fuel constraints imposed by the user. The solution of the linear program provides the fuel quantities that need to be fed to each generator at each hour of the planning horizon so that the (expected value of) cost is minimized.

A test is next made in decision block 77 to determine if the current fuel allocation is the same as before. If not, a new cost function for each generator is computed in function block 78 before the process loops back to function block 75. Using the linear program solution in function block 78, a new $\bar{h}_{i,t}^{s}$ for each generator can now be computed by averaging the values of $$h_{t,j}^{s}\left(\frac{\$}{\text{BTU}}\right)$$

over all fuels fed to a given generator. The new value of $\bar{h}_{i,t}^{s}$ yields a new cost function, $f_{i,t}^{s}$, that is used in resolving the unit commitment problem.

As the process is repeated, the fuel mixtures and the load on the generators approach an optimal solution for the problem. If the test in decision block 77 is yes; i.e., the fuel allocation has not changed as a result of the new iteration, then the process moves to function block 79. In this case, the process has converged to an optimal solution. Function block 79 outputs the results of the final iteration. This includes the status of each generating unit at each time period and under each scenario, the amount of power generated on each generator at each time period and under each scenario, the marginal prices or the Lagrange multipliers, and the fuel usage provided by the linear program solution. The process is then terminated.

Procedure TREE

The procedure TREE is called in function block 72 in the process shown in FIG. 7. Given a forecast for power-trading transactions in the next two to seven days, TREE generates a scenario tree that represents trade opportunities. Note that we do not concern ourselves with trading transactions on the following day because utilities are required to close all deals twenty-four hours in advance.

Figure 8:
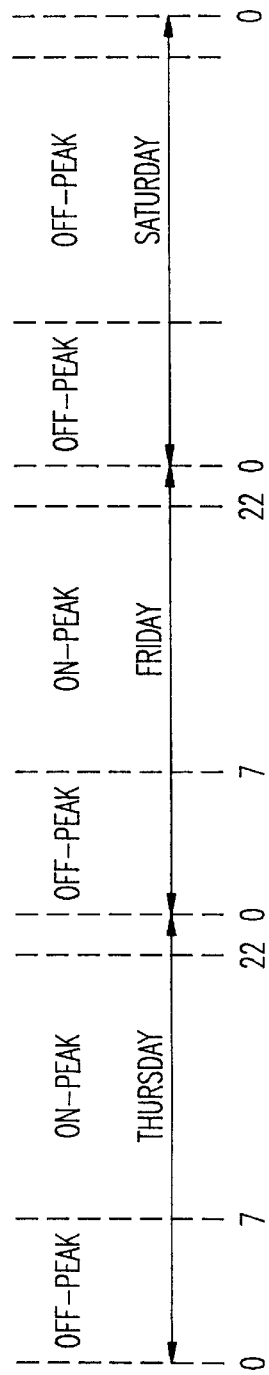
FIG. 8 is a time line illustrating on-peak and off-peak time periods.

To create a scenario tree, the user supplies his or her vision of the power market in the next two to seven days. A "vision" is represented by the size of a contract in MWH, the cost of contractual power per MWH, the type of contract; i.e., whether it is buying or selling, the day on which the delivery will take place, and the time of delivery. The time of delivery can be either on-peak or off-peak. The on-peak period is between 7:00 a.m. and 10:59 p.m. while the off-peak period covers the rest of the day. Weekends are considered off-peak. The user must provide a probability for each contract. FIG. 8 is a time line illustrating on-peak and off-peak time periods.

Given that we may initiate a trade at two points in time for a given day, the scenario tree branches at most at two points on all days except for the weekend. On Saturdays and Sundays we have one branching point per day. To create the scenario tree, it is assumed that the contractual load for the first day is known (because the contracts are closed for this day). For day two, a number of branches are created equal to the number of off-peak contracts. The branching point is the beginning of day two. The probability of each branch is the same as the probability of the corresponding trade. At 7:00 a.m. of day two, for each branch of the tree a set of branches are created to reflect the on-peak potential contracts. The probability of each new branch is equal to the probability of its contract times the probability of its predecessor. If the probability of a branch is below a certain threshold, $\epsilon$, the branch is eliminated. The probability of this branch is distributed among other branches that share the same predecessor in proportion to their probabilities. The process is repeated until the last branching point in the system is reached.

The previous process may yield a large number of scenarios. In practice however, due to the difficulty in predicting the market on a horizon longer than three days, power-trading forecasts are given for day two and day three only. Another factor that reduces the number of scenarios is the use of $\epsilon$. A scenario with a probability of $\epsilon$ or less is assumed to be insignificant. Our experience indicates that in a reasonable tree, $\epsilon$ can be set to 2% without affecting the hedging results. In other words, it is sufficient to consider fifty or less scenarios.

Figure 9A:
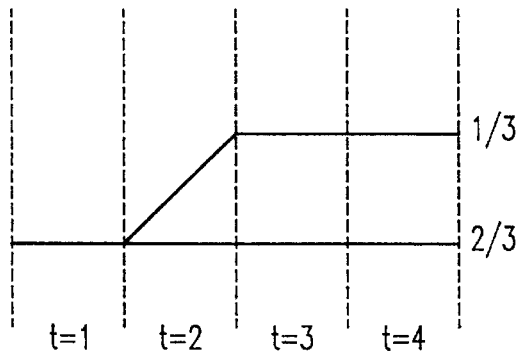
FIGS. 9A and 9B time lines showing the use of trade forecasts to create new scenarios.
Figure 9B:
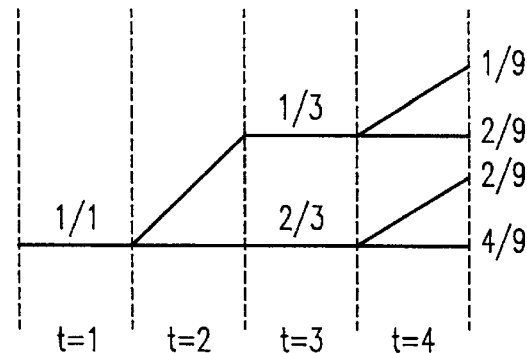

The user may prefer to provide a set of load forecasts (and a set of corresponding fuel prices $h^{t,j,s}$) instead of a single one. In this case, the process of branching, using trade forecasts, needs to be performed on each load scenario. The probabilities need also to be multiplied by the probability of each load forecast. To give an example, consider the scenario tree of FIG. 9A. The user provides two possible forecasts. The first has a probability of $\frac{1}{3}$ and the second has a probability of $\frac{2}{3}$. Let us say that we expect to sell a certain amount of power with a probability $\frac{1}{3}$ on the beginning of period four. Then, each load forecast branches at the beginning of period four creating two branches. The final probabilities are shown in FIG. 9B.

A depth-first search is used to generate the scenario tree. The steps required when one load forecast is supplied are described. The method can be generalized easily to the case in which multiple load forecasts are provided. To fix notations, assume that the load forecast is $\bar{d}(t)$, $t=1, \ldots, T$. Denote the number of branching points by M and the time periods at which a branching takes place by $\bar{\tau}(i)$, $i=1, \ldots, M$. $\Omega(i)$ is defined to be the set of all trades that can start at time $\bar{\tau}(i)$. The user of our system supplies for each trade, $j=1, \ldots, J$, its end point, $\tau_{e}(j)$; its volume, $v(j)$ MWH; cost per unit, $\zeta(j)$ \$/MWH; and its probability, $\pi(j)$. Note that $v(j)$ is negative if j represents a purchase offer and positive if j is a selling offer.

The approach is clarified through the example of Table 3.

TABLE 3

| j | $\tau_e$ | v | $\zeta$ | $\pi$ |
|---|---|---|---|---|
| 1 | 3 | 0 | 0 | 0.50 |
| 2 | 3 | 20 | 25 | 0.25 |
| 3 | 3 | 10 | 15 | 0.25 |
| 4 | 4 | 0 | 0 | 0.67 |
| 5 | 4 | −10 | 10 | 0.33 |

Assume that we have four periods. We can sell twenty MWH with probability $\frac{1}{4}$ or sell ten MWH with probability $\frac{1}{4}$. Each of these two selling contracts starts at the beginning of period two and has a duration of two periods. At the beginning of period four, we may buy ten MWH with a probability of $\frac{1}{3}$. Note that $\Omega(1)=\{1,2\}$, $\Omega(2)=\{3\}$, $\bar{\tau}(1)=2$, and $\bar{\tau}(2)=4$. It is assumed that $\bar{d}(t)=0$, $t=1, \ldots, 4$. Depth-first produces the scenarios as shown in Table 4.

TABLE 4

| s/t | 1 | 2 | 3 | 4 | p | $\tau$ | $\sigma$ | K | $\Delta z$ |
|---|---|---|---|---|---|---|---|---|---|
| 1 | 0 | 0 | 0 | 0 | 0.33 | 1 | 1 | 4 | 0 |
| 2 | 0 | 0 | 0 | −10 | 0.17 | 4 | 1 | 5 | 100 |
| 3 | 0 | 20 | 20 | 0 | 0.17 | 2 | 1 | 8 | −500 |
| 4 | 0 | 20 | 20 | −10 | 0.08 | 4 | 4 | 9 | −400 |
| 5 | 0 | 10 | 10 | 0 | 0.17 | 2 | 1 | 12 | −150 |
| 6 | 0 | 10 | 10 | −10 | 0.08 | 4 | 5 | 13 | −50 |

To manage the scenarios efficiently, for each scenario, s, the first point in time at which it branches off the tree, $\tau(s)$, its predecessor, $\sigma(s)$, and the change in the objective function cost due to buying/selling power, $\Delta z(s)$, are stored. The scenarios are stored in a string of real numbers, d. For example, the scenarios of Table 4 are stored in the form (0,0,0,0,−10,20,20,0,−10,10,10,0,−10). The variable $\kappa(s)$ indicates the location in which the last element of scenario s is stored. For example, Scenario 1 is stored in $d(1) \ldots d(\kappa(1))$. For Scenario 2, only the fourth period needs to be changed. Hence, its elements are stored in $d(\kappa(1)+1 \ldots \kappa(2))$ or $d(5)$. This scheme reduces the memory needed to store the scenario tree. If we guarantee that there is no overlap between the trades of two different branching points, it is possible to further refine the previous approach.

The following is a pseudo-code of the depth-first search.
Input. integer T, integer M, integer J, float $\bar{d}(1 \ldots T)$, integer $\bar{\tau}(1 \ldots M)$, integer $\Omega(1 \ldots M, 1 \ldots |\Omega(i)|)$, integer $\tau_e(1 \ldots J)$, float $v(1 \ldots J)$, float $\zeta(1 \ldots J)$, float $\pi(1 \ldots J)$
Output. integer S, integer $\tau(1 \ldots S)$, integer $\sigma(1 \ldots S)$, integer $\kappa(1 \ldots S)$, float $\Delta z(1 \ldots S)$, float $d(1 \ldots T \times S)$
Local Variables. integer i, integer k, integer $l(1 \ldots M)$
Initialization.
1. Set $k \leftarrow M$, $S \leftarrow 1$, and $l(i) \leftarrow 1$, $i=1, \ldots, M$.
2. Set $\tau(S) \leftarrow 1$, $\sigma(S) \leftarrow 1$, and $\kappa(S) \leftarrow T$.
3. Add $v(\Omega(i,l(i)))$ to $\bar{d}$ between $\bar{\tau}(i)$ and $\tau_e(\Omega(i,l(i)))$ for all $i=1, \ldots, M$. Store the resulting vector in $d(1 \ldots \kappa(S))$.

4. Set $\Delta z(S) \leftarrow \sum_{i=1}^{M} v(\Omega(i, l(i))) \zeta(\Omega(i, l(i)))$ General Step.
1. Increment $l(k)$ by 1.
2. If $l(k)=|\Omega(k)|+1$, then
   set $l(k) \leftarrow 1$ and $k \leftarrow k-1$.
   If $k=0$, then terminate.

Go to 1.

3. For each i=k, ..., M, add v(Ω(l(i))) to $\bar{d}$ between $\bar{\tau}$(i) and $\tau_f$((Ω(l(i))). Store the resulting vector in d(κ(S)+1 ... κ(S)+1+T−$\bar{\tau}$(k)).

4. Set σ(S+1)←S, τ(S+1)←τ(k), and κ(S+1)←κ(S)+1+T−$\bar{\tau}$(k).

5. Set $\Delta z(S+1) \leftarrow \sum_{i=1}^{M} v(\Omega(l(i)))\zeta(\Omega(l(i)))$.

6. Set S←S+1 and k←M.

7. Go to 1.

At termination, one can eliminate all scenarios that have probabilities less than ε and distribute these probabilities among other scenarios.

Procedure BUNDLE

Figure 10:
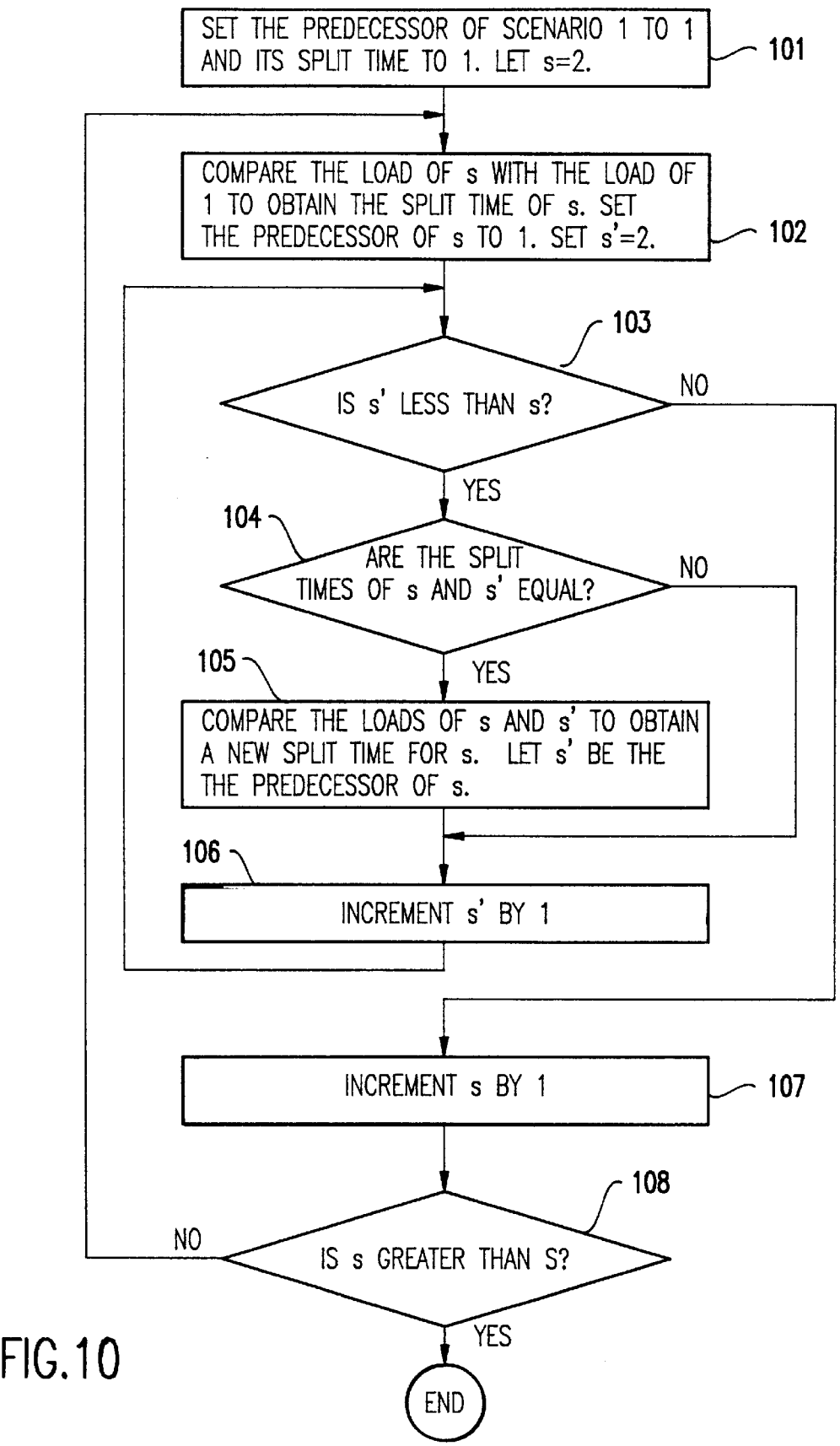
FIG. 10 is a flow diagram of the BUNDLE procedure implemented in a preferred embodiment of the invention.

The procedure BUNDLE is called in function block 72, if needed, in the process shown in FIG. 7. The flow diagram of BUNDLE is shown in FIG. 10. Procedure BUNDLE begins in function block 101 in which the predecessor of Scenario 1 is set to 1, its split time is set to 1, and the scenario index, s, is set to 2. In function block 102, the load of scenario s is compared to the load of scenario 1 to determine the split time of s. That is, we find the first point in time at which the load of Scenario s is different from that of Scenario 1. At this point, the predecessor of s is set to 1. A new variable, s', is introduced and initialized to 2. The idea is to compare the load of s to all other scenarios s'=1, ..., s−1, in order to determine the split time and predecessor of s. The comparison between Scenario s and Scenario 1 is performed in function block 102 while the comparison between s and each s' in {2, ... s−1} is performed in function block 105.

In decision block 103, a determination is made as to whether s' is less than s. If s'≤s, i.e., s'=s, then the execution is transferred to function block 107 in which s is incremented by 1; otherwise, the execution moves to decision block 104.

In decision block 104, the split times of s and s' are compared. If they are not equal, then the execution is transferred to function block 106. The fact that the split times are not equal indicates that s' should not be used as a predecessor to s. If the split times are equal, then s' might be used as a predecessor to s. In this case, the execution is transferred to function block 105.

In function block 105, the loads of s and s' are compared to obtain a new split time for s. As one can see, the split time of Scenario s is getting higher as we go through more scenarios s' which results in lesser storage for the scenario tree. The predecessor of Scenario s is set to s'. Then, in function block 106, the value of s' is incremented by 1. This is how all scenarios from 2 to s−1 are scanned to determine the predecessor and split time of s. In function block 107, the index s is incremented by 1, as already mentioned. This is how all the scenarios in the scenario tree are scanned. Finally, in decision block 108, s is checked against the total number of scenarios, S, in our model. If s=S, the execution is terminated; otherwise, the execution is transferred to decision block 102 to continue processing.

Thus, given a set of load forecasts, $d_t^s$, t=1, ..., T, s=1, ..., S, the procedure BUNDLE organizes these loads in the form of a tree. For example, if S=2 and T=3 and if $d^1$=(1, 2, 2) and $d^2$=(1, 2, 3), then $d^1$ and $d^2$ form a tree that has one branch at t=1 and t=2 and two branches at t=3. The role of BUNDLE is to study the forecasts, $d^1$, ..., $d^s$, and to define the different branches of the tree. Note that if the scenarios are generated by TREE, then there is no need for using BUNDLE. The procedure BUNDLE is provided to handle the case in which scenarios are provided by the user.

Figure 11:
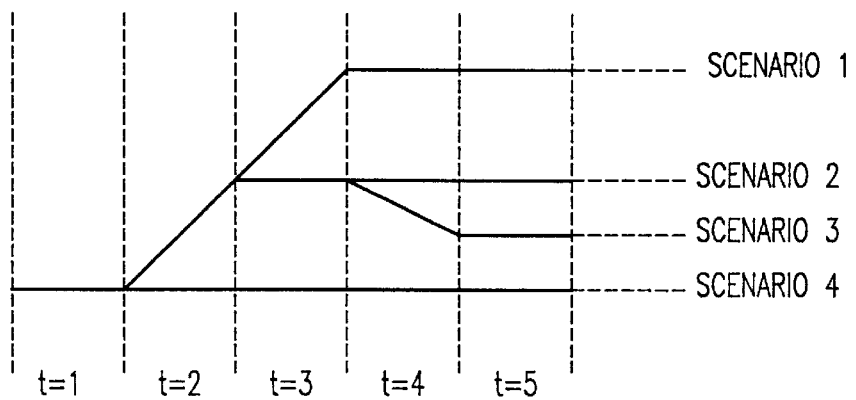
FIG. 11 is a time line showing a scenario tree with four scenarios.

To clarify the previous points, the scenario tree of FIG. 11 is used. The process is initialized by setting τ(1)=1 and σ(1)=1. Scenario 2 has the same demand as Scenario 1 for the first two periods. Then, τ(2)=3 and σ(2)=1. To place Scenario 3 in the tree, Scenario 3 and Scenario 1 are first compared which results in τ(3)=3 and σ(3)=1. Now, given that τ(3)=τ(2)=3, Scenario 3 and Scenario 2 are compared starting at period 3. Scenario 3 branches off Scenario 2 in the fourth period. That is, we set τ(3)=4 and σ(3)=2. Finally, comparing Scenario 4 with Scenario 1 yields τ(4)=2 and σ(4)=1. Given that τ(4)≠τ(2), we do not compare scenarios 2 and 4. In the case of scenarios 3 and 4, we have τ(3)≠τ(4) and the process terminates.

The following is a pseudo code of the procedure BUNDLE.

Parameters. float ε≈10.0

Input. integer T, integer S, float $\bar{d}$(1 ... S, 1 ... T)

Output. integer τ(1 ... S), integer σ(1 ... S), integer κ(1 ... S), float d(1 ... T×S)

Local Variables. integer t, integer s, integer s'.

Initialization. Set τ(1)←1, σ(1)←1, and κ(1)←T.

General Step. For each scenario, s=2, ..., S,

Find the first time-period, t, at which $|\bar{d}(s, t)-\bar{d}(1, t)|>\epsilon$. Set τ(s)←1 and σ(s)←1.

For each scenario s'=2, ..., s−1, if τ(s)=τ(s'), then find the first time-period, t>τ(s), at which $|\bar{d}(s, t)-\bar{d}(s', t)|>\epsilon$ and set τ(s)←t and σ(s)←s'.

Set κ(s)←κ(s−1)+T−τ(s)+1.

Procedure SUCP

Figure 12:
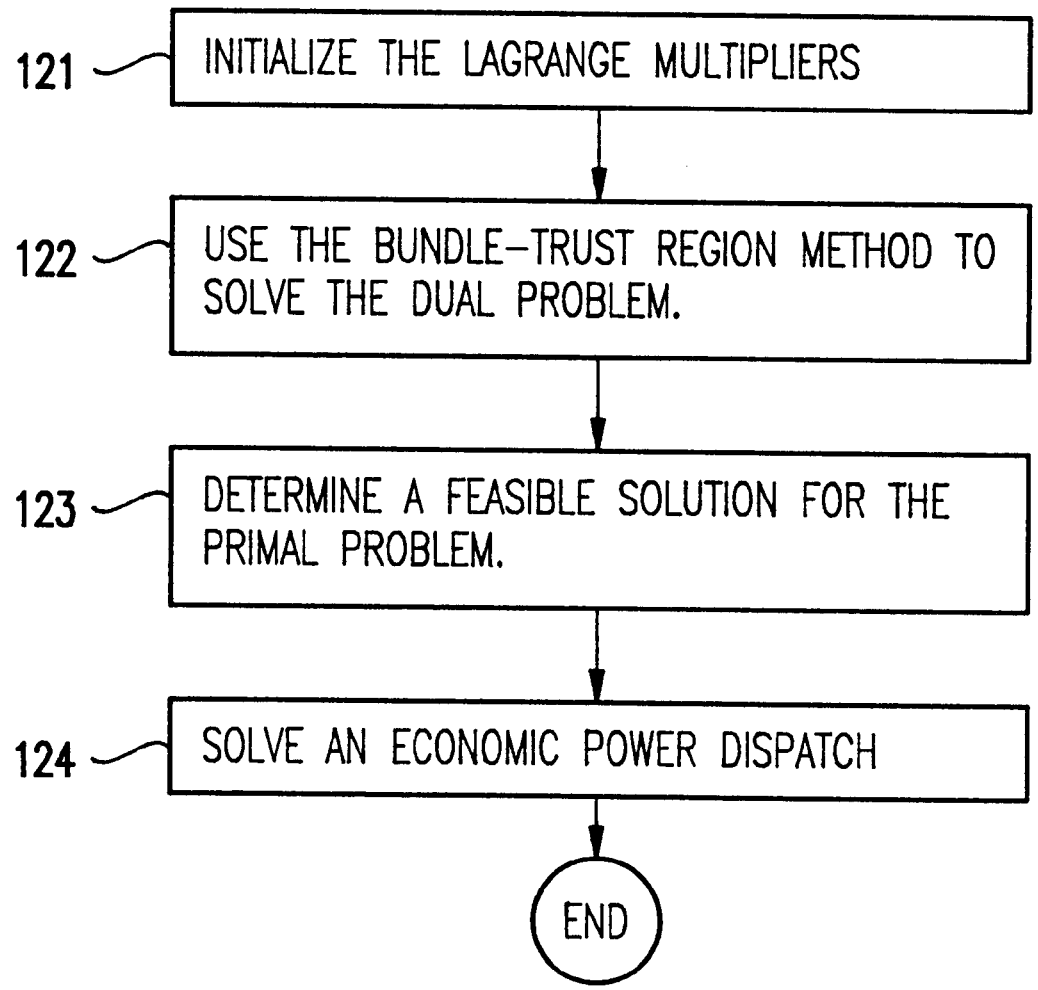
FIG. 12 is a flow diagram of the SUCP procedure implemented by the preferred embodiment of the invention.

The procedure SUCP is called in function block 75 of the flow diagram shown in FIG. 7. The flow diagram for the procedure SUCP is shown in FIG. 12. The execution starts at function block 121 in which the Lagrange multipliers are initialized. There are different methods for this initialization in the literature. The following simple procedure is suggested:

1. Using an average fuel cost, $$\bar{h}_{t,j}^s \left(\frac{\$}{BTU}\right),$$

construct cost functions $f_{i,t}^s$.

2. For each scenario and period in the planning horizon,

Rank the generators in the ascending order of average marginal cost ($/MWH) at the maximum production level, $G_{i,t}$.

Select enough generators so that the load and spinning-reserve constraints are met.

Solve an economic power dispatch. The dual variables, λ and μ, can be used to start the bundle trust-region method.

Refer to S. Takriti, J. R. Birge and E. Long, ibid., for more details.

In function block 122, the bundle-trust method for solving the dual problem is used. This method is described in H. Schramm and J. Zowe, "A Version of the Bundle Idea for Minimizing a Nonsmooth Function: Conceptual Idea, Convergence Analysis, Numerical Results", *SIAM Journal on Optimization*, 2(1), pp. 121–152, February 1992. A brief description of this algorithm is given below:

Let $\pi_1=(\lambda_1,\mu_1)$, where $\lambda_1$ and $\mu_1$ are the dual multipliers obtained from the Initialization step. Denote the Lagragian by $\pounds(\pi)$ and a subgradient for it at $\pi_1$ by $\omega_1$. Set $k \leftarrow 1$.

1. Solve the program $\max_{\pi}\{\min_{1\leq i \leq k}\omega_i^T\pi + \omega_i^T(\pi_i - \pi_k)\}$ $$\max_{\overline{\pi}} \{\min_{1\leq i \leq k} \omega_i^T \overline{\pi} + \omega_i^T(\pi_i - \pi_k) + \pounds(\pi_i)\} + \frac{1}{2t_k}\overline{\pi}^T\overline{\pi}.$$

2. If $\pounds(\pi_k+\overline{\pi})$ is sufficiently larger than $\pounds(\pi_k)$, then either
   (a) enlarge $t_k$ and go back to 1; or
   (b) set $\pi_{k+1}=\pi_k+\overline{\pi}$,
   (c) compute a new subgradient $\omega_k$ by calling DP for all generators and computing the slack of demand and reserve constraints,
   (d) increase k by 1 and go to 1.
3. If $\pounds(\pi_k+\overline{\pi})$ is not sufficiently larger than $\pounds(\pi_k)$, then either
   (a) reduce $t_k$ and go back to 1; or
   (b) set $\pi_{k+1}=\pi_k$,
   (c) compute a subgradient, $\omega_{k+1}$, at $\pi_k+\overline{\pi}$,
   (d) go to 1. The algorithm terminates when the norm of the subgradient is small enough. At this point, an optimal solution for the dual problem has been found. Note that at termination of function block 122, there may not be a feasible solution for the stochastic unit commitment problem. In function block 123, the solution of function block 122 is used to search for a feasible solution for the primal problem; i.e., the stochastic unit commitment model. The preferred approach is that of F. Zhuang and F. D. Galiana, "Towards a More Rigorous and Practical Unit Commitment by Lagrangian Relaxation", *IEEE Transactions on Power Systems*, 3(2), pp. 763–773, 1998. The following is a brief description of their approach:

1. If all reserve constraints are satisfied, then proceed to the economic power-dispatch phase.
2. Weight the violations of reserve constraints by their probabilities. Find scenario s and period t for which the weighted reserve constraints are most severely violated.
3. Increase $\mu_t^s$ by $\Delta\mu$ and resolve DP.
4. Go to 1.

After obtaining a feasible solution, the execution moves to function block 124 in which an economic power dispatch is solved. This is the problem of allocating the electric load optimally between the different generators at each time period and under each scenario. Note that the economic dispatch problem assumes that units' status are given (from solving a unit commitment). Economic dispatch is a simple mathematical program in which each time-period is treated independently of others (unless we want to consider ramping rates). To solve such a problem efficiently, one can relax the demand and spinning-reserve constraints for each period and solve the dual. A good starting point is the Lagrange multipliers obtained from the unit-commitment solver. Given that the generators' cost functions depend on fuel prices, we revise the fuel mix using the economic power-dispatch solution. If the changes in fuel mix are significant, we resolve the economic power dispatch model. Note that one can avoid iterating between economic power dispatch and fuel assignment by merging these two problems into a large-scale mathematical program. The standard economic power dispatch method is modified to fit the model implemented in the present invention. Here is the resulting procedure:

1. Solve a minimization problem for each period of the planning horizon. Each problem has two constraints: demand and spinning reserves. These two constraints are relaxed using $\lambda$ and $\mu$ and the Lagrangian is optimized over the resulting period.
2. If the total generation cost is equal (close enough) to that of the previous iteration, then terminate.
3. Using the load on each generator, call the procedure FUEL.
4. Compute a new cost function.
5. Go to 1.

For a more detailed description of the economic power dispatch problem, the reader is referred to the book of A. J. Wood and B. F. Wollenberg, ibid.

Summarizing, given a set of generators, $\{1, \ldots, N\}$, and all related data, such as $f_{i,t}^s$, $g_{i,t}$, $\underline{G}_{i,t}$, and $\overline{G}_{i,t}$, and given a set of load forecasts on the electric system at each period in the planning horizon, SUCP solves a stochastic unit commitment problem. That is, it produces, for each scenario, a schedule indicating the time periods in which each generating unit is running and its load during these periods. The resulting schedule guarantees that the total generation cost is close to minimal and that the system provides enough supply to meet demand. An important output of SUCP is the marginal cost, $\lambda_t^s$ (\$/MWH), of power at each period. Under a given scenario, the marginal cost at time t is the cost, over all operating generators, of producing one unit of power during this period. Marginal costs are of great value to the decision maker because they provide pricing information that can be used in decisions related to buying and selling power.

SUCP assumes that the cost curves, $f_{i,t}^s$, are given and independent of fuel prices (which are dealt with in FUEL). Mathematically, SUCP minimizes the cost function $$\min_{u,x} \sum_{s=1}^{S} p_s \sum_{i=1}^{N} \sum_{t=1}^{T} f_{i,t}^s(x_{i,t}^s) + (u_{i,t}^s - u_{i,t-1}^s)^+ SU_{i,t}^s - (u_{i,t}^s - u_{i,t-1}^s)^- SD_i^s, \quad (1)$$

where $(u_{i,t}^s - u_{i,t-1}^s)^+$ and $(u_{i,t}^s - u_{i,t-1}^s)^-$ are the positive and negative parts of $u_{i,t}^s - u_{i,t-1}^s$. The minimization of (1) is subject to the demand constraints $$\sum_{i=1}^{N} x_{i,t}^s \geq d_t^s, t = 1, \ldots, T, s = 1, \ldots, S,$$

and spinning-reserve constraints $$\sum_{i=1}^{N} u_{i,t}^s G_{i,t} \geq d_t^s + r_t^s, t = 1, \ldots, T, s = 1, \ldots, S,$$

in addition to minimum up-time, minimum down-time, and operating capacity of each generator. Note that it is desirable in some cases to impose additional constraints to improve the reliability of the solution. The treatment of any set of linear constraints that links the generators is similar to that suggested for the above constraints.

The procedure described is based on Lagrangian relaxation. To solve (1), the demand and spinning-reserve constraints are relaxed by associating non-negative multipliers, $\lambda$ and $\mu$, with them. The value of $\lambda_t^s$ represents the marginal cost of producing power during t. Similarly, $\mu_t^s$ represents the cost of having spinning reserves on-line at time period t.

The problem becomes that of maximizing the resulting concave dual. This is the main attraction behind this approach: substituting a difficult primal by a convex program. On the other hand, the resulting Lagrangian is not smooth. The bundle trust-region method of Schramm and Zowe, ibid., is used to solve the dual.

Relaxing the demand and spinning-reserve constraints decouples the generating units. Each generator's problem is solved using dynamic programming. The solutions to the dynamic programs provide the load on each generator. Using the solutions of the single-generator dynamic programs, one can compute the total generation at each time period and under each scenario. We check for optimality and, if needed, we repeat the previous process using an updated $\lambda$ and $\mu$. The violations of the demand and reserve constraints form a subgradient to the dual which can be used in the bundle method iterations.

If a parallel computer is available, the dynamic programs of the generating units can be distributed among the processors. Given that solving the dynamic program of a cycler requires more calculations than solving the dynamic program of a must-run unit, we distribute the single-generator problems so that the number of cyclers and the number of must-run units are almost the same over all processors.

Procedure FUEL

Figure 15:
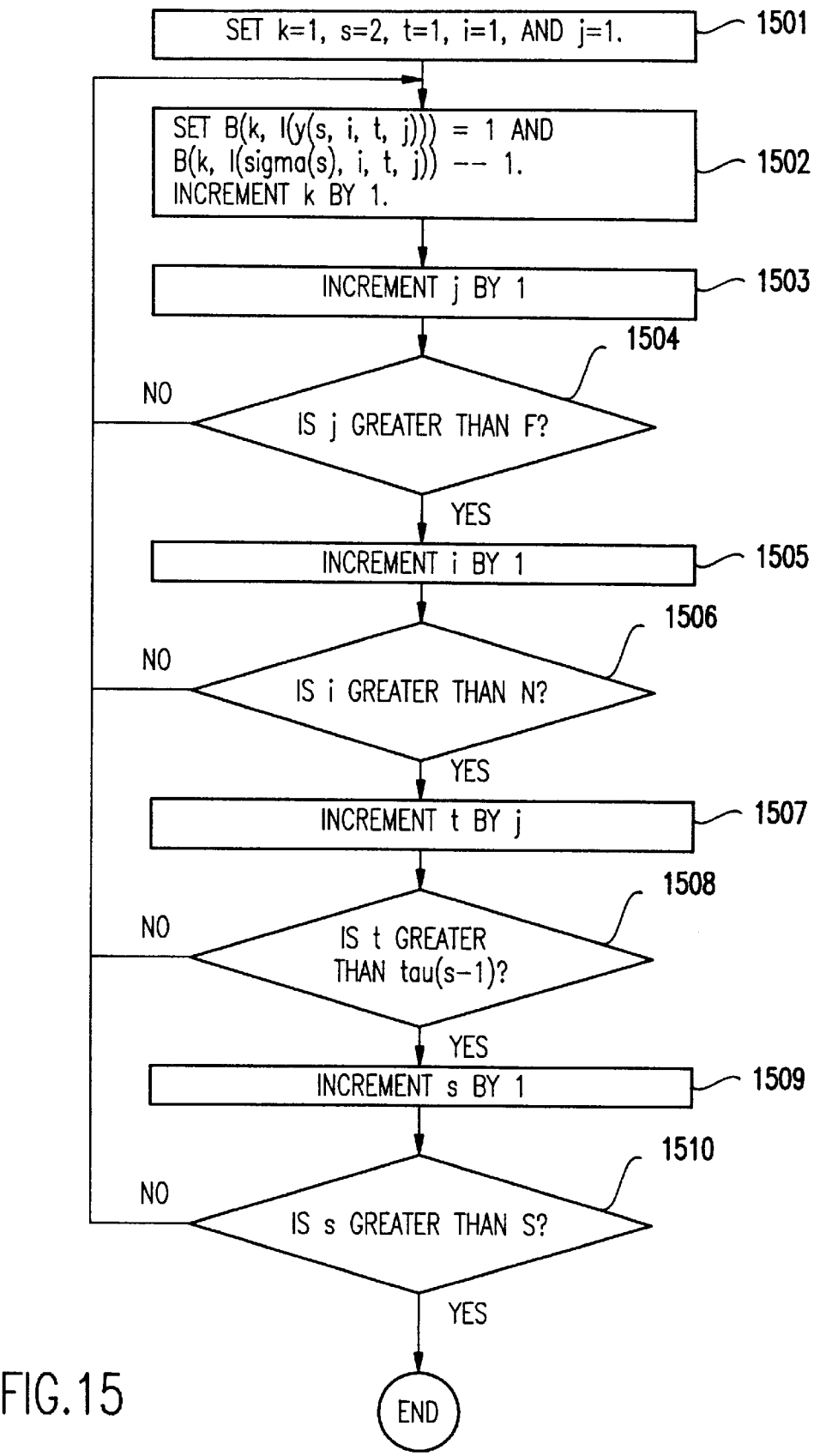
FIG. 15 is a flow diagram of the FUEL procedure implemented by the preferred embodiment of the invention.

The procedure FUEL is called by the procedure SUCP. Procedure FUEL solves a linear program to determine an optimal allocation for fuel under certain generation load, $x_{i,t}^s$. The constraint matrix of the linear program is built iteratively, as shown in FIG. 15.

The process starts in function block 1501 in which we set $k\leftarrow 1$, $s\leftarrow 2$, $t\leftarrow 1$, $i\leftarrow 1$, and $j\leftarrow 1$. These variables are the counters used in the construction of the constraint matrix of the linear program solved to obtain an optimal fuel allocation. In function block 1502, $B(k,I(y_{i,t,j}^s))$ to 1 and $B(k,I(y_{i,t,j}^{o(s)}))$ to $-1$. Note that $I(y_{i,t,j}^s)$ is the index of the column in the constraint matrix corresponding to the variable $y_{i,t,j}^s$. Similarly, $I(y_{i,t,j}^{o(s)})$ is the index of the column in the constraint matrix corresponding to $y_{i,t,j}^{o(s)}$.

In function block 1503, the value of j is incremented by 1. Then, in decision block 1504, if $j \leq F$, the execution is directed to function block 1502; otherwise, the execution is directed to function block 1505. In function block 1505, i is incremented by 1. Then, in decision block 1506, if $i \leq N$, the execution is directed to function block 1502; otherwise, the execution block proceeds to function block 1507. In function block 1507, the value of t is incremented by 1. Then, in decision block 1508, if $t \leq \tau(s-1)$, the execution is directed to function block 1502; otherwise, the execution proceeds to function block 1509. In function block 1509, the value of the scenario index, s, is increased by 1. Then, in decision block 1510, if $s \leq S$, the execution is directed to function block 1502; otherwise, the execution terminates.

The cost of generating one MWH of electricity is a function of the cost of fuel used and its heat content. It is assumed that we have F different fuels and that the cost of providing a BTU using fuel j at time t is $h_{t,j}^s$ \$/BTU. Note that s here is a scenario index that reflects load forecasts provided by the user. When TREE builds on these forecasts to generate new scenarios, each branch in the resulting tree has values of h equal to those of the original scenario that is used to create this branch. Note that $h_{t,j}^s$ is a function of t which allows incorporating the fluctuation in fuel cost, over the planning horizon, into calculations. Given the generation load, $x_{t,j}^s$, under scenario s on each unit i at time period t, we must provide enough fuel to generate the required electric power. That is, the amount of fuel used must satisfy the constraint $$\sum_{j=1}^{F} y_{i,t,j}^s = x_{i,t}^s, i = 1, \ldots, N, t = 1, \ldots, T, s = 1, \ldots, S,$$

where $y_{i,t,j}^s \geq 0$ is the heat generated (BTU) by fuel j on generator i at time t under s. For the start-up energy requirement, we enforce a similar constraint, $$\sum_{j \in \Gamma_i} y_{i,t,j}^s = (u_{i,t}^s - u_{i,t-1}^s) + SU_i^h$$

where $\Gamma i$ is the set of fuels that may be used to start-up generator i.

There might be other constraints that need to be imposed on fuel allocation. For example, we may want to impose a constraint on the maximum amount of fuel j that can be used by a certain generating unit, i, during the planning horizon. That is, $$\sum_{t=1}^{T} y_{i,t,j}^s$$

must be less than the total heat available from fuel j regardless of s. Another constraint might be an upper bound on the amount of fuel j used over the planning horizon. In other words, the value of $$\sum_{i=1}^{N} \sum_{t=1}^{T} y_{i,t,j}^s$$

must be bounded above by a given constant. An important constraint is "fuel j cannot be used on unit i" which can be modeled by setting $y_{i,t,j}^s = 0$ for all t and s. To simplify notations, we write fuel constraints (which are assumed to be linear) in the form $Ay \leq b^h$ where A is a constraint matrix of appropriate dimension and $b^h$ is the corresponding right-hand side.

Note that the fuel usage of a generator must fulfill the bundle (i.e., non-anticipativity) constraints imposed by the scenario tree. For example, if Scenario 1 and Scenario 2 have the same load between the first period and $\tau$, then $y_{i,t,j}^1 - y_{i,t,j}^2 = 0$ for all $i=1, \ldots, n$, $t=1, \ldots \tau$, $j=1, \ldots, F$. The constraint matrix corresponding to bundle constraints is denoted by B. The matrix B is constructed using the variables $\sigma$ and $\tau$ returned by TREE and BUNDLE. To do so, $I(y_{i,t,j}^s)$ is defined to be the column of B (or A) that corresponds to the variable $y_{i,t,j}^s$. An integer k is used to count the number of rows in B. The pseudocode for the iterative process of building the linear program solved by FUEL is as follows (see FIG. 15):

- Initialization. Set $k \cdot 1$.
- General Step.

For all $s=2, \ldots, S$,

For all $t=1, \ldots, \tau(s-1)$,

-continued

For all $i=1, \ldots, N$,

For all $j=1, \ldots, F$,

Set $B(k, I(y_{i,t,j}^s)) \leftarrow 1$ and $B(k, I(y_{i,t,j}^{\sigma(s)})) \leftarrow -1$.

Increment $k$ by 1.

Next $j$

Next $i$

Next $t$

Next $s$

At termination, k is the total number of bundle constraints. To reduce storage requirement, only the non-zero elements of B are stored.

To utilize fuel optimally, the expected cost of the fuel used is minimized by solving the stochastic linear program $$\min_{s.t.} \sum_{s=1}^{S} p_s \sum_{i=1}^{N} \sum_{t=1}^{T} \sum_{j=1}^{F} h_{t,j}^s Y_{i,t,j}^s + \alpha e^T \overline{y} + \beta e^T \underline{y} \sum_{j=1}^{F} y_{i,t,j}^s - \overline{y} + \underline{y} = x_{i,t}^s,$$

$$\sum_{j \in \Gamma_1} y_{i,t,j}^s - \overline{y}' + \underline{y}' = (u_{i,t}^s - u_{i,t-1}^s) + SU_i^h,$$

$$Ay \leq b^h,$$
$$By = 0,$$
$$y, \overline{y}, \underline{y} \geq 0,$$

where $\overline{y}$ and $\underline{y}$ are the vectors of excess and shortage of fuel, $\alpha$ and $\beta$ are penalties on violating the constraint $$\sum_{j=1}^{F} y_{i,t,j}^s = x_{i,t}^s,$$

and 1 is a vector of ones. The previous stochastic linear program is solved using an interior point approach (e.g., I. J. Lustig, J. M. Mulvey and T. J. Carpenter, "Formulating stochastic programs for interior point methods", *Operations Research*, 39:757–770, 1991). Many commercial packages already include convenient routines for such techniques (see, for example, the Optimization Subroutine Library of IBM). If a parallel computer is available, the process can be accelerated as described in I. J. Lustig and E. Rothberg, "Gigaflops in linear programming", *Operations Research Letters*, 18:157–165, 1996.

Procedure DP

Figure 14:
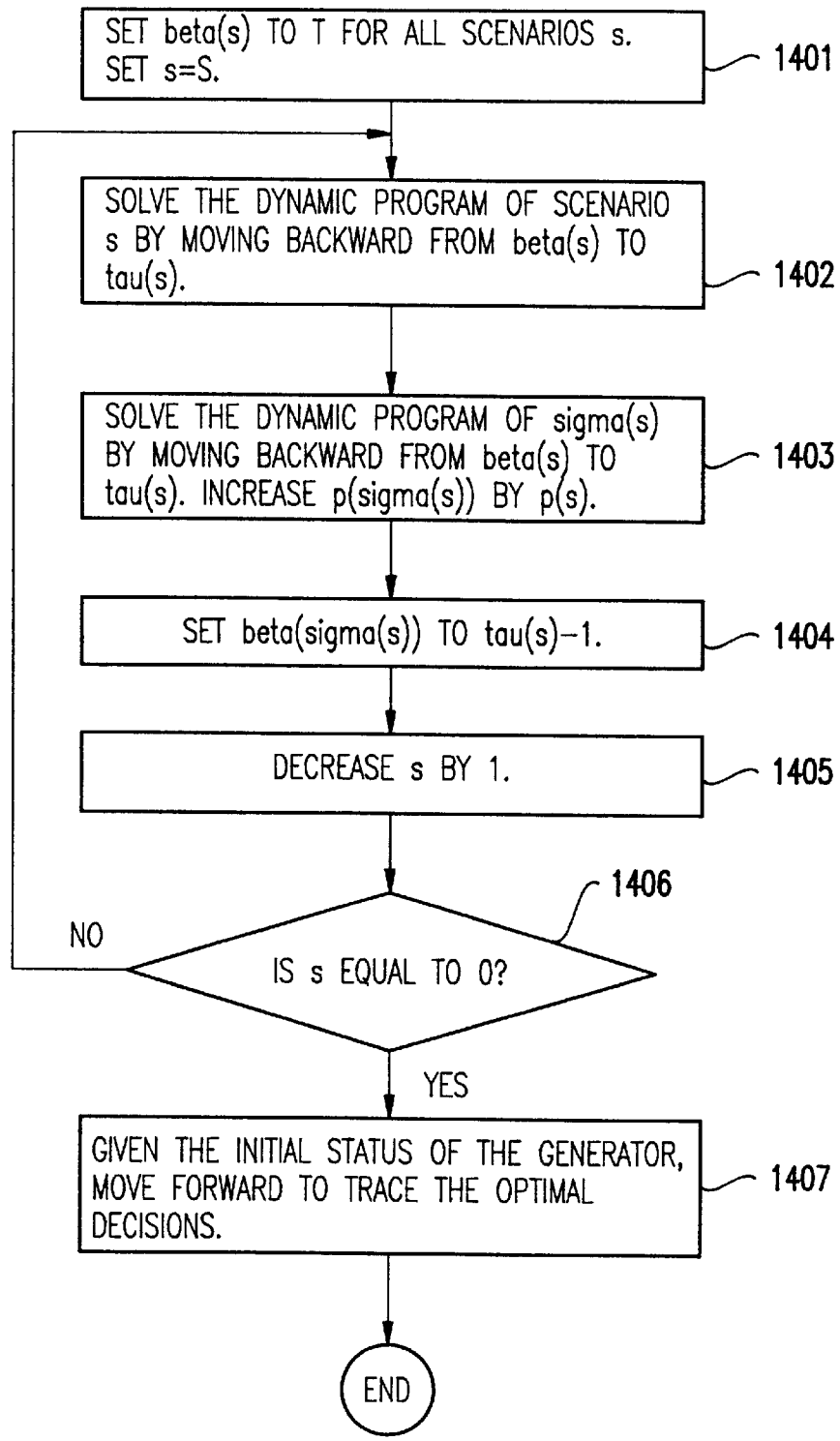
FIG. 14 is a flow diagram of the DP procedure implemented by the preferred embodiment of the invention.

The procedure DP is called from the bundle trust region method of function block 122 in FIG. 12 which shows the procedure SUCP. The flow diagram of the procedure DP is shown in FIG. 14. Given the Lagrange multipliers, DP determines the status and the load on a generating unit by solving a dynamic program. In function block 1401, the values of $\beta(s)$, $s=1, \ldots, S$, are initialized to T. The recursion starts at time period T and moves backward until time period 1 is reached. The time period under investigation for scenario s is $\beta(s)$. The scenario index s is set to S. The dynamic program of scenario s is solved by moving backward in time from period $\beta(s)$ to $\tau(s)$. What is being done here is similar to the dynamic programming approach used in solving stochastic decision processes. See, for example, D. P. Bertsekas, *Dynamic Programming: Deterministic and Stochastic Models*, Prentice Hall, 1987.

In function block 1403, the dynamic program of $\sigma(s)$ is solved by moving backward from time period $\beta(s)$ to time period $\tau(s)$. At this stage both of the dynamic programs of s and its predecessor $\sigma(s)$ have been solved. The probability $p(\sigma(s))$ of $\sigma(s)$ is incremented by p(s). Then, in function block 1404, the value of $\beta(\sigma(s))$ is set to $\tau(s)-1$. The scenario index, s, is decreased by 1 in function block 1405. That is, the dynamic program of s is done, and we are ready to move on to another scenario s-1. In decision block 1406, a check is made to determine if s=0; e.g., have all scenarios been studied? If so, the procedure moves to function block 1407; otherwise, the procedure moves to function block 1402 to study a new scenario. In function block 1407, the solution of the dynamic program has been finished, and we move forward to trace the optimal decisions of the dynamic program. The policy obtained at the end of this stage is the optimal policy that is returned to the calling routine.

Given the data related to a generator, procedure DP solves the corresponding single-generator dynamic program and returns an optimal schedule, u, for this generator and the load on it, x, under all scenarios at each period in the planning horizon. The stages in our dynamic programming formulation are the time periods. Each stage has $L_i+l_i$ states. The first $L_i$ states are those corresponding to the generator being on and the second $l_i$ states correspond to the generator being off. The number of states can be reduced to two in some cases as suggested by S. Takriti, J. R. Birge and E. Long, ibid.

Figure 13A:
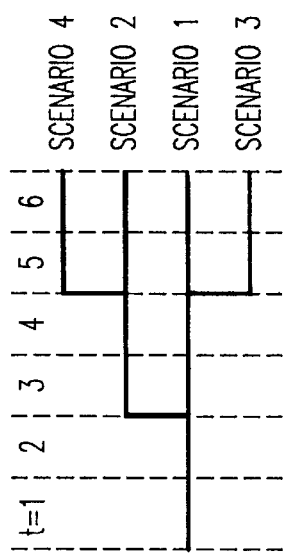
FIGS. 13A and 13B are, respectively, a time line and a diagram showing the process of solving a dynamic program for a scenario tree with four scenarios and six time periods.
Figure 13B:
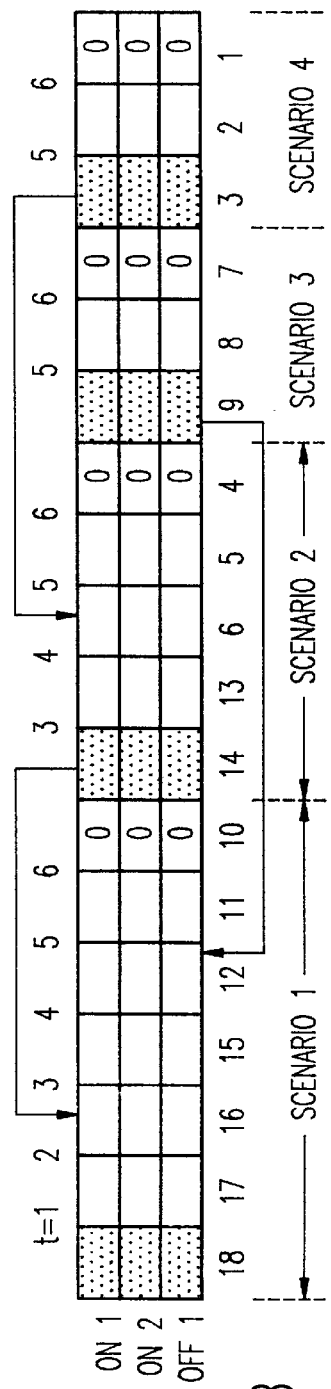

Given a scenario tree that is described using $\tau(s)$ and $\sigma(s)$, $s=1, \ldots, S$, DP solves a single-generator dynamic program by moving backward. A method for organizing the calculations and computer storage are described that a high performance is achieved (see FIGS. 13A and 13B).

For the following pseudocode of the procedure DP, it is assumed that scenarios, $s=1, \ldots, S$, are sorted in the ascending order of $\tau(s)$.

Input. integer T, integer N, integer l, integer L, integer v, integer w, float d(1 . . . S,1 . . . T), float p(1 . . . S)

Output. integer u(1 . . . S,1 . . . T), float x(1 . . . S, 1 . . . T)

Local Variables. integer j, integer s, integer t, integer, $\beta(1 \ldots S)$, integer $\gamma(1 \ldots S)$ Initialization. Allocate enough memory for $$1 + \sum_{s=1}^{S} (T - \tau(s) + 1)$$

stages. Each stage contains L+l states and each state constitutes of a real number (cost-to-go) and an integer number (the predecessor index). Set $$j \leftarrow 1 + \sum_{s=1}^{S} (T - \tau(s) + 1).$$

Set $\beta(s) \leftarrow T$, $s=1, \ldots, S$. For each scenario $s=1, \ldots, S$, set $\gamma(s)=j$ and $j \leftarrow j-(T-\tau(s)+1)$.

General Step.

For each scenario $s=S, \ldots, 1$,

Starting at $t=\beta(s)$, move backward using dynamic programming until $t=\tau(s)$. These calculations must be performed in the allocated space $\gamma(s)$ to $\gamma(s)-(T\tau(s)+1)$. Each state must maintain the index of the predecessor state that provided an optimal solution for it.

Starting at $t=\beta(\sigma(s))$, move backward using dynamic programming until $t=\tau(s)$. These calculations are performed in the allocated space $\gamma(\sigma(s))$ to $\gamma(\sigma(s))-(T-\tau(s)+1)$. Set $\kappa(\sigma(s))=\tau(s)-1$.

Increment the states of stage $\gamma(\sigma(s))$ by the values of the states in $\gamma(s)-(T-\tau(s)+1)$ weighted by $p_s$.

Increment $p_{\sigma(s)}$ by $p_s$.

Using the initial state of the generator, trace the optimal paths to obtain an optimal decision tree. Note that to find that moving backward requires solving an optimization problem at each stage. This problem is that of minimizing $f_{i,t}{}^s(x_{i,t}{}^s)-\lambda_t{}^s x_{i,t}{}^s$ subject to $g_{i,t} \leq x_{i,t}{}^s \leq G_{i,t}$. There might be some other bounds on $x_{i,t}{}^s$ that can be incorporated. For example, if "the load on a generator cannot exceed $(g_{i,t}+G_{i,t})/2$ in the first hour after turning it on", then we can force this constraint on the dynamic program in the row corresponding to "On 1" (see FIG. 13B).

To accelerate the calculations, DP is applied to cycling units only. For must-run units, one can find the optimal loads by minimizing the function $f(x)-\lambda x$ at each time period. In general, the peakers can be ignored, $u_{i,t}{}^s=0$, because they are operated in cases of emergency.

System's Output

Now, the output of the tool according to the invention is described. First, the status, $u_{i,t}{}^s$, of a generator, i, is a binary variable that indicates whether this generator is on, $u_{i,t}{}^s=1$, or off, $u_{i,t}{}^s=0$, at time period t under scenario s. The procedure guarantees that the resulting values of $u_{i,t}{}^s$ are feasible; i.e., (a) they satisfy the minimum up-time and minimum down-time requirements. For example, if the minimum up-time, $L_i$, of a generator, i, is equal to three, then sequences such as 0110, 0100, and 0101, are infeasible. The reason for that is that when the generator is switched on; i.e., $0 \to 1$, it has to remain on for three periods or more. Note that the sequence 0111 is feasible in this example.

(b) they are consistent between the different scenarios. This condition is known as non-anticipativity in stochastic programming (see, for example, Rockafellar and Wets, "Scenarios and policy aggregation in optimization under uncertainty", *Mathematics of Operations Research*, 16(1):119–147, 1991). To clarify this concept, let us pay attention to the beginning of the first period, t=1, in our planning horizon. Although there are different scenarios that may occur in the future, we must make one decision for each generating unit regardless of which scenario may occur in the periods to come. This implies that the decision we make must be feasible for all scenarios, s=1, . . . , S. To further clarify the concept of non-anticipativity, let us discuss the set of scenarios presented in FIG. 11. The scenarios are organized in a scenario tree. Each branching node in the scenario tree (which must be at the beginning of a period) represents a point in the planning horizon at which we can make decisions regarding the status of our generators: switch on or switch off a unit. The first decision point is the beginning of the first period, t=1. Note that all scenarios go through this node. Hence, the decisions made at this node must be feasible to all scenarios (because we do not know which scenario we may face in the future). Mathematically speaking, we must enforce the constraint $u_{i,1}{}^s=u_{i,1}{}^{s'}$, $\forall s$ and $s' \in \{1, 2, 3, 4\}$ for each generator $i \in \{1, \ldots, N\}$. During the first period, we expect our demand pattern to follow one of two paths: either that of Scenario 4 or the path of scenarios 1, 2, and 3. Let us assume that our demand is moving up during the first period; i.e., we are expecting scenario 1, 2, or 3 in the future. When we reach the beginning of period 2 which is our second decision point, we must make decisions that are feasible for scenarios 1, 2, and 3 (because we do not know yet which one is going to occur). The mathematical constraint is then $u_{i,2}{}^s=u_{i,2}{}^{s'}$, $\forall s$ and $s' \in \{1,2,3\}$ for each generator $i \in \{1, \ldots, N\}$.

Let us say that during period 2, we observe a demand pattern similar to that of scenario 2 (or scenario 3 since they are the same so far). At the beginning of period 3, we make a decision for each generator such that our decision set is feasible for the demand of scenario 2 and that of scenario 3. The process continues as long as we have two or more scenarios sharing the same demand pattern up until this point in time.

To summarize, the procedure produces an implementable set of decisions. That is, decisions that satisfy the mathematical conditions imposed by the structure of the scenario tree. The fact that we have a set of scenarios improves the robustness of the solution obtained without sacrificing the implementability of the decisions among the scenarios.

Second, if the status of a generator, i, at a certain time period, t, and under scenario s is 1, then the procedure provides the load (MWH) on this generator during t. The load, indicated by $x_{i,t}{}^s$, satisfies the constraints imposed by the operational range of the generator. That is, $\pounds_{i,t} \leq x_{i,t}{}^s \leq G_{i,t}$, $\forall i \in \{1, \ldots, N\}$, $\forall t \in \{1, \ldots, T\}$, $\forall s \in \{1, \ldots S\}$. If $u_{i,t}{}^s=0$, then the load is 0.

Third, the variables $y_{i,t,j}{}^s$ of FUEL provides an optimal fuel allocation. Given the heat content, $\alpha_j$ BTU/Ton, of fuel j, the expected amount of fuel used by generator i at time t is $$\sum_{s=1}^{S} p_s y_{i,t,j}^s / \alpha_j.$$

Of course, when scenario s is observed, we adopt the fuel strategy imposed by the variables $y_{i,t,j}{}^s$.

Fourth, the procedure also provides the average cost per unit of power, $\lambda_t{}^s$, at each time period under every scenario. These values can be used in pricing the power at each time period of the planning horizon. Note that as time progresses, we obtain a new forecast. The excess capacity in the electric system (over the refined forecast) represents the amount of power that we should offer to sell in the market. In case of having less generation than the new forecasted load, we buy the needed power from the open market.

Fifth, the values of the dual variables of the linear program of procedure FUEL and of the stochastic program of procedure SUCP provide important sensitivity analysis information. For example, the value of $\lambda_t{}^s$ indicates the change in the generation cost if $d_t{}^s$ increases by one unit. The dual variables of FUEL denote the economical importance of each constraint and how it may affect the value of an optimal solution. Note that the dual variables corresponding to the bundle constraints in FUEL indicate the importance of non-anticipativity for a given scenario and time period. Finally, one can use the linear program to study the range in which fuel prices can change without changing the optimal fuel allocation.

Note that in reality, the observed scenario is (most likely) not a member of the set of the original scenarios used in the model. One can adopt the solution of the closest scenario and apply it to the real system.

Commercial packages available in the market deal with one forecast and provide a feasible schedule. They do not consider the uncertainty in future demands and do not model the buying and selling transactions. Also, these packages do not incorporate fuel constraints and changes in fuel cost in their models. On the other hand, our model considers uncertainty by using a set of scenarios and produces prices at which power may be traded without violating fuel constraints.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a risk management system that schedules generating units of an electric utility while taking into consideration power trading with other utilities and a stochastic load on the utility system, a computer implemented method comprising the steps of:

inputting load forecast, trading forecast and generator and fuel properties;

generating load scenarios as a scenario tree that approximates future uncertainties in load and trades;

computing an initial approximate value for the cost per British Thermal Unit (BTU);

obtaining a load on each generator under any scenario and, given the load on each generator, determining an optimal fuel allocation to obtain a cost function of generating a Megawatt Hour (MWH) of power on each generator;

solving a stochastic unit-commitment model to obtain a generation of each unit at each time period under different scenarios which can be used to compute heat-input needed for each unit throughout a planning horizon;

solving a linear program in which decision variables are amount of fuel burnt on each unit at each time period, wherein decision variables have a component for each possible fuel in the model and the linear program is solved subject to a constraint that fuel fed to a generator must be sufficient to generate the heat needed;

determining if a current fuel allocation is the same as before and, if not, computing a new cost function for each generator for all fuels fed to a given generator, the new cost function being used in resolving unit commitment;

repeating the steps of solving the stochastic unit-commitment model until the fuel mixtures and the load on the generators approach an optimal solution; and outputting fuel consumption, generation requirement and load for each generator of the utility at each period and the fuels to be used.

2. The computer implemented method of claim 1 wherein a generator may use more than one fuel at any time period, the step of computing an initial approximate value for the cost per BTU being performed by using the fuel with the least cost.

3. The computer implemented method of claim 1 wherein the step of obtaining a load on each generator is performed by the steps of:

constructing cost functions using an average fuel cost;

for each scenario and period in a planning horizon, ranking the generators in an ascending order of average marginal cost at a maximum production level, selecting enough generators so that the load and spinning-reserve constraints are met, and solving an economic power dispatch;

determining a feasible solution for a stochastic unit commitment model; and solving an economic power dispatch.

4. The computer implemented method of claim 1 wherein a generator may use more than one fuel at any time period, the step of computing an initial approximate value for the cost per BTU comprises the steps of:

approximating the cost per BTU by using a fuel with the least cost;

solving a unit commitment problem to determine the amount of power generated by each generating unit;

finding an optimal fuel mixture for each generator at each time period and under each scenario using linear programming; and repeating the previous two steps as long as the fuel mixture obtained from the linear programming solution changes between iterations.

5. The computer implemented method of claim 1 wherein a user of the risk management system may provide a scenario tree which is processed to define bundle constraints, two scenarios being members of the same bundle at time t if their loads are the same up until time t.

6. The computer implemented method of claim 5 wherein the processing of the scenario tree to define bundle constraints comprises the steps of:

setting a predecessor of Scenario 1 to 1, a split time of Scenario 1 to 1, and a scenario index, s, to 2;

comparing a load of Scenario s to a load of Scenario 1 to determine a split time of s as a first point in time at which the load of Scenario s is different from that of Scenario 1 and, at this point, setting a predecessor of s to 1;

introducing a new variable, s', and initializing s' to 2;

comparing the load of s to all other scenarios s'=1, . . . , s−1, in order to determine a split time and predecessor of s;

determining whether s' is less than s and, if so, incrementing s by 1, but otherwise, comparing split times of s and s';

if split times of s and s' are not equal, indicating that s' should not be used as a predecessor to s, incrementing s' by 1, but otherwise, comparing the loads of s and s' to obtain a new split time for s and setting the predecessor of Scenario s to s' before incrementing s' by 1;

when all the scenarios in the scenario tree are scanned, checking s against a total number of scenarios, S, and if s=S, terminating the execution but otherwise, the execution is continued until all scenarios, S, have been processed.

7. In a risk management system that schedules generating units of an electric utility while taking into consideration power trading with other utilities and a load on the utility system, a computer implemented method comprising the steps of:

inputting factor data comprising load forecast, trading forecast, spot market estimates, and generator properties and fuel properties, costs and constraints;

generating load scenarios that approximate future uncertainties in at least some of the factor data;

obtaining a load on each generator under at least one of said scenarios and determining an optimal fuel allocation to obtain a cost function of generating power on each generator;

solving a plurality of commitment models to obtain a generation of each unit at each time period under different scenarios which can be used to compute energy input needed for each generator unit throughout a planning horizon;

selecting an optimal fuel mixture and a load on the generators based on the models; and outputting fuel consumption, generation requirement and load for each generator of the utility at each period and the fuels to be used and outputting average production costs at each period under each scenario.

* * * * *